(12) United States Patent
Beshai

(10) Patent No.: US 7,602,771 B1  
(45) Date of Patent: Oct. 13, 2009

(54) TWO-DIMENSIONAL CIRCULATING SWITCH

(75) Inventor: Maged E. Beshai, Stittsville (CA)

(73) Assignee: Nortel Networks Limited, St. Laurent, Quebec (CA)

(*) Notice: Subject to any disclaimer, the term of this patent is extended or adjusted under 35 U.S.C. 154(b) by 836 days.

(21) Appl. No.: 11/025,077

(22) Filed: Dec. 30, 2004

(51) Int. Cl.  
 H04L 12/28 (2006.01)  
 H04L 12/56 (2006.01)

(52) U.S. Cl. .................. 370/380; 370/388; 370/387; 370/386

(58) Field of Classification Search ......... 370/367–372, 370/391, 255, 229–235, 380, 388, 387, 386; 398/54  
See application file for complete search history.

(56) References Cited

U.S. PATENT DOCUMENTS

| | | | |
|---|---|---|---|
| 4,884,264 A | 11/1989 | Servel et al. | |
| 4,905,225 A | 2/1990 | Francois et al. | |
| 5,168,492 A | 12/1992 | Beshai et al. | |
| 5,528,406 A * | 6/1996 | Jeffrey et al. | 398/55 |
| 5,544,168 A * | 8/1996 | Jeffrey et al. | 370/391 |
| 5,703,879 A | 12/1997 | Proctor et al. | |
| 5,745,486 A | 4/1998 | Beshai et al. | |
| 6,154,583 A | 11/2000 | Kuroyanagi et al. | |
| 6,307,852 B1 | 10/2001 | Fisher et al. | |
| 6,486,983 B1 * | 11/2002 | Beshai et al. | 398/54 |
| 6,570,872 B1 * | 5/2003 | Beshai et al. | 370/369 |
| 6,721,271 B1 | 4/2004 | Beshai et al. | |
| 6,876,649 B1 * | 4/2005 | Beshai | 370/355 |
| 7,002,926 B1 * | 2/2006 | Eneboe et al. | 370/255 |
| 7,289,440 B1 * | 10/2007 | Beshai et al. | 370/229 |
| 7,519,053 B2 * | 4/2009 | Beshai | 370/380 |
| 2003/0012214 A1 * | 1/2003 | Munter | 370/429 |
| 2004/0109633 A1 | 6/2004 | Pittman et al. | |

FOREIGN PATENT DOCUMENTS

| | | | |
|---|---|---|---|
| EP | 1026856 | | 8/2000 |
| EP | 1026856 | * | 9/2000 |
| EP | 1087635 | | 3/2001 |

OTHER PUBLICATIONS

Abdel Ejnioou and N. Rangaathan (Routing on Switch Matrix Multi-FPGA Systems, Apr. 2003).*

* cited by examiner

*Primary Examiner*—Edan Orgad  
*Assistant Examiner*—Chuong T Ho

(57) ABSTRACT

A one-dimensional circulating switch may be defined by connections between several switch modules and one or more temporal cyclic rotators. Where a switch module that is part of a first one-dimensional circulating switch is also connected one or more temporal cyclic rotators that define a second one-dimensional circulating switch, a two-dimensional circulating switch is formed. A two-dimensional circulating switch is flexible and may scale to capacities ranging from a few gigabits per second to multiple Petabits per second.

14 Claims, 28 Drawing Sheets

| | t | 0 | 1 | 2 | 3 | 0 | 1 | 2 | 3 | 0 | 1 | 2 | 3 |
|---|---|---|---|---|---|---|---|---|---|---|---|---|---|
| | T | 0 | 1 | 2 | 3 | 4 | 5 | 6 | 7 | 8 | 9 | 10 | 11 |
| Switch Module 522-1630 | Aj | B | C | D | E | B | C | D | E | B | C | D | E |
| | Bj | C | D | E | A | C | D | E | A | C | D | E | A |
| | Cj | D | E | A | B | D | E | A | B | D | E | A | B |
| | Dj | E | A | B | C | E | A | B | C | E | A | B | C |
| | Ej | A | B | C | D | A | B | C | D | A | B | C | D |
| Switch Module 522-1630 | Aj | E | D | C | B | E | D | C | B | E | D | C | B |
| | Bj | A | E | D | C | A | E | D | C | A | E | D | C |
| | Cj | B | A | E | D | B | A | E | D | B | A | E | D |
| | Dj | C | B | A | E | C | B | A | E | C | B | A | E |
| | Ej | D | C | B | A | D | C | B | A | D | C | B | A |
| Switch Module 522-1628 | k0 | 1 | 2 | 3 | 4 | 1 | 2 | 3 | 4 | 1 | 2 | 3 | 4 |
| | k1 | 2 | 3 | 4 | 0 | 2 | 3 | 4 | 0 | 2 | 3 | 4 | 0 |
| | k2 | 3 | 4 | 0 | 1 | 3 | 4 | 0 | 1 | 3 | 4 | 0 | 1 |
| | k3 | 4 | 0 | 1 | 2 | 4 | 0 | 1 | 2 | 4 | 0 | 1 | 2 |
| | k4 | 0 | 1 | 2 | 3 | 0 | 1 | 2 | 3 | 0 | 1 | 2 | 3 |
| Switch Module 522-1628 | k0 | 4 | 3 | 2 | 1 | 4 | 3 | 2 | 1 | 4 | 3 | 2 | 1 |
| | k1 | 0 | 4 | 3 | 2 | 0 | 4 | 3 | 2 | 0 | 4 | 3 | 2 |
| | k2 | 1 | 0 | 4 | 3 | 1 | 0 | 4 | 3 | 1 | 0 | 4 | 3 |
| | k3 | 2 | 1 | 0 | 4 | 2 | 1 | 0 | 4 | 2 | 1 | 0 | 4 |
| | k4 | 3 | 2 | 1 | 0 | 3 | 2 | 1 | 0 | 3 | 2 | 1 | 0 |

| t | 0 | 1 | 2 | 3 | 0 | 1 | 2 | 3 | 0 | 1 | 2 | 3 |
|---|---|---|---|---|---|---|---|---|---|---|---|---|
| T | 0 | 1 | 2 | 3 | 4 | 5 | 6 | 7 | 8 | 9 | 10 | 11 |

Switch Module 522-1628

| B0 | 4 | 3 | 2 | 1 | 4 | 3 | 2 | 1 | 4 | 3 | 2 | 1 |
|----|---|---|---|---|---|---|---|---|---|---|---|---|
| B1 | 0 | 4 | 3 | 2 | 0 | 4 | 3 | 2 | 0 | 4 | 3 | 2 |
| B2 | 1 | 0 | 4 | 3 | 1 | 0 | 4 | 3 | 1 | 0 | 4 | 3 |
| B3 | 2 | 1 | 0 | 4 | 2 | 1 | 0 | 4 | 2 | 1 | 0 | 4 |
| B4 | 3 | 2 | 1 | 0 | 3 | 2 | 1 | 0 | 3 | 2 | 1 | 0 |

Switch Module 522-1630

| A0 | B | C | D | E | A | B | C | D | E | A | B | C | D | E |
|----|---|---|---|---|---|---|---|---|---|---|---|---|---|---|
| B0 | C | D | E | A | B | C | D | E | A | B | C | D | E | A |
| C0 | D | E | A | B | C | D | E | A | B | C | D | E | A | B |
| D0 | E | A | B | C | D | E | A | B | C | D | E | A | B | C |
| E0 | A | B | C | D | E | A | B | C | D | E | A | B | C | D |

Switch Module 522-1628

| E0 | 4 | 3 | 2 | 1 | 4 | 3 | 2 | 1 | 4 | 3 | 2 | 1 |
|----|---|---|---|---|---|---|---|---|---|---|---|---|
| E1 | 0 | 4 | 3 | 2 | 0 | 4 | 3 | 2 | 0 | 4 | 3 | 2 |
| E2 | 1 | 0 | 4 | 3 | 1 | 0 | 4 | 3 | 1 | 0 | 4 | 3 |
| E3 | 2 | 1 | 0 | 4 | 2 | 1 | 0 | 4 | 2 | 1 | 0 | 4 |
| E4 | 3 | 2 | 1 | 0 | 3 | 2 | 1 | 0 | 3 | 2 | 1 | 0 |

FIG. 24

Matrix 2410-1:

| | Aj k0 | Bj k1 | Cj k2 | Dj k3 | Ej k4 |
|---|---|---|---|---|---|
| Aj k0 | × | 0 | 1 | 2 | 3 |
| Bj k1 | 3 | × | 0 | 1 | 2 |
| Cj k2 | 2 | 3 | × | 0 | 1 |
| Dj k3 | 1 | 2 | 3 | × | 0 |
| Ej k4 | 0 | 1 | 2 | 3 | × |

(entry 2412)

Matrix 2410-2:

| | Aj k0 | Bj k1 | Cj k2 | Dj k3 | Ej k4 |
|---|---|---|---|---|---|
| Aj k0 | × | 3 | 2 | 1 | 0 |
| Bj k1 | 0 | × | 1 | 2 | 3 |
| Cj k2 | 1 | 0 | × | 3 | 2 |
| Dj k3 | 2 | 1 | 0 | × | 1 |
| Ej k4 | 3 | 2 | 1 | 0 | × |

(entry 2422)

TWO-DIMENSIONAL CIRCULATING SWITCH

CROSS REFERENCE TO RELATED APPLICATIONS

The present application claims the benefit of prior U.S. application Ser. No. 10/780,557 filed Feb. 19, 2004, the content of which is hereby incorporated herein by reference.

FIELD OF THE INVENTION

The present invention relates to multi-service switches and, more particularly, to the architecture and control of a two-dimensional switch that employs temporal cyclic rotators.

BACKGROUND

Switch design has received a significant attention and a large variety of switch architecture alternatives has been developed over several decades. Most structures reported in the literature, or used in practice, fall under one of two categories. The first is the multi-stage family of switches and the second is the time-multiplexed space-switch-based family of switches.

Several switch elements may be interconnected to create a modular switch having a capacity that is higher than the capacity of any of the constituent switch elements. A switch element may qualify as a building unit of a modular switch if it is internally contention free. A common-memory switch is an example of a contention-free switch. The ratio of the access capacity of the modular switch to the access capacity of the largest constituent switch element may be called the capacity gain. By necessity, the capacity of each constituent switch element may be considered to be divided into an access capacity and an inner capacity, where the access capacity (also called throughput) is the capacity available to users of the modular switch and the inner capacity is the capacity used for interconnection to other switch elements. A measure of the efficiency of a modular switch may be derived as the ratio of the aggregate access capacity of all constituent switch elements to the total capacity of all constituent switch elements. By these definitions, the efficiency of a single switch element is 1.0 and the capacity gain, G, of a single switch element is 1.0.

One of the popular modular structures is the multi-stage structure known as the Clos network, which comprises an odd number of stages (3, 5, 7, etc.), where a path from any ingress port to any egress port traverses a switch element in each stage. The ultimate capacity of a multi-stage Clos structure is determined by the number of stages and the sizes of its switch elements. The multi-stage Clos-type structure is usually limited to three stages. To reduce or eliminate internal blocking in a three-stage Clos switch, the inner side of each of the first and third switch elements is required to have a higher capacity than the corresponding outer side. With k denoting the number of ingress ports of a first-stage switch element or the number of egress ports of a third-stage switch element, switch elements of dimension N×N each would be used in the middle stage, where N is selected to be larger than k in order to provide an internal expansion to reduce internal blocking caused by misalignment of free channels; all ports in all switch elements are considered to be of equal capacity, e.g., 10 Gigabits per second (Gb/s) each. Switch elements of dimension k×N each would be used in the first stage, and switch elements of dimension N×k each would be used in the third stage. The dimension of the three-stage Clos switch is then (k×N)×(k×N), its capacity is k×N×R, where R is the rated capacity, in bits per second, of each ingress port or egress port. The capacity gain equals k and the efficiency E equals k/(k+2×N). In a data Clos switch, each of the switch elements may have a common-memory structure.

In order to realize a multi-stage switch of large dimension, switch elements of a relatively large dimension would be required. For example, to realize a switch of 8192×8192 using a three-stage structure, non-blocking switch elements of dimension 128×128 would be required.

A high-capacity switch that may use switch elements of relatively smaller dimensions can be realized using a space switch to interconnect the switch elements. A conventional time-multiplexed space switch using input buffers, and usually output buffers, may provide high scalability. Each input buffer may be paired with an output buffer and each paired input and output buffers may be included in an input/output module. The scalability of a conventional time-multiplexed space switch is determined by two factors. The first factor, and the more severe of the two, is the scheduling effort, which is traditionally based on arbitration among input ports vying for the same output port. The second factor is the quadratic fabric complexity of the space switch where structural complexity increases with the square of the number of ports. The capacity gain is determined by the dimension of the space switch and the dimension of an input/output module. Input/output modules each having multiple ports may connect to multiple space switches operating in parallel.

The capability and efficiency of a switching network are determined primarily by its switches and, because of this pivotal role of the switches, switch design continues to attract significant attention. It is desirable to construct modular large-scale switches using switch modules of a relatively small dimension in order to suit a variety of deployment conditions. Modular switches that scale from a moderate capacity, of 160 gigabits per second (Gb/s) having a dimension of 16×16 with 10 Gb/s input or output channels, to a high capacity of hundreds of terabits per second (Tb/s) having a dimension exceeding 16384×16384, using non-blocking switch elements each of a relatively small dimension (not exceeding 8×8, for example) would significantly facilitate the construction of efficient high-capacity networks of global coverage.

SUMMARY

A one-dimensional circulating switch may be defined by connection between several switch modules and one or more temporal cyclic rotators. Where a switch module that is part of a first one-dimensional circulating switch is also connected to one or more temporal cyclic rotators that define a second one-dimensional circulating switch, a two-dimensional circulating switch is formed.

Advantageously, the two-dimensional circulating switch may be considered scalable up to multiple Petabits per second, using medium-capacity switch modules. Additionally, the two-dimensional circulating switch may be considered robust in that it continues to function under partial component failure. Further advantageously, the capacity of the two-dimensional circulating switch may be expanded without service interruption. Still further, the two-dimensional circulating switch may be adapted to handle many different services, including those services characterized by packets, bursts, Time Division Multiplexed (TDM) frames, Synchronous Optical Network (SONET) frames, channels, etc.

In accordance with an aspect of the present invention there is provided a two-dimensional circulating switch. The two-dimensional circulating switch includes a plurality of switch modules, a first plurality of rotors and a second plurality of rotors. Each switch module of the plurality of switch modules is: connected to a first rotor from among the first plurality of rotors by a first link and connected to a second rotor from among the second plurality of rotors by a second link. Any two switch modules among the plurality of switch modules connected to a common rotor in the first plurality of rotors connect to different rotors in the second plurality of rotors. Each rotor in the first plurality of rotors is connected to at least as many switch modules in the plurality of switch modules as there are rotors in the second plurality of rotors.

In accordance with another aspect of the present invention there is provided a two-dimensional circulating switch. The two-dimensional circulating switch includes a plurality of primary one-dimensional circulating switches, each primary one-dimensional circulating switch of the plurality of primary one-dimensional circulating switches including at least two switch modules, selected from among a plurality of switch modules, interconnected by a rotor selected from among a plurality of rotors and a plurality of secondary one-dimensional circulating switches, each secondary one-dimensional circulating switch of the plurality of secondary one-dimensional circulating switches including at least two switch modules, selected from among the plurality of switch modules, interconnected by a rotor selected from among the plurality of rotors. Each primary one-dimensional circulating switch includes a switch module included in each secondary one-dimensional circulating switch.

In accordance with a further aspect of the present invention there is provided a method of scheduling a connection from a source switch module to a destination switch module, in a two-dimensional circulating switch having a plurality of rotators and a plurality of switch modules arranged into a first number of primary one-dimensional circulating switches and a second number of secondary one-dimensional circulating switches, where each primary one-dimensional circulating switch includes a switch module from each secondary one-dimensional circulating switch. Where said source switch module and said destination switch module belong to different primary one-dimensional circulating switches and different secondary one-dimension circulating switches, the method includes designating a set of routes from the source switch module to the destination switch module, each route in the set of routes traversing at least two paths, each path traversing one rotator from among the plurality of rotators, and performing a vacancy-matching process for successive paths in at least one route in the set of routes.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention:

FIG. 16 illustrates exemplary connectivity tables of rotators for use in defining paths between switch modules in the two-dimensional circulating switch of FIG. 5;

FIG. 18 illustrates further exemplary connectivity tables for two rotators in the two-dimensional circulating switch of FIG. 5;

FIG. 19 illustrates even further exemplary connectivity tables for two rotators in the two-dimensional circulating switch of FIG. 5;

FIG. 21 illustrates exemplary connectivity tables for three rotators in the two-dimensional circulating switch of FIG. 5;

FIG. 22 illustrates further exemplary connectivity tables for three rotators in the two-dimensional circulating switch of FIG. 5;

FIG. 24 illustrates exemplary rotator connectivity matrices for two rotators of opposite rotation directions in the two-dimensional circulating switch of FIG. 5;

DETAILED DESCRIPTION

Figure 1:
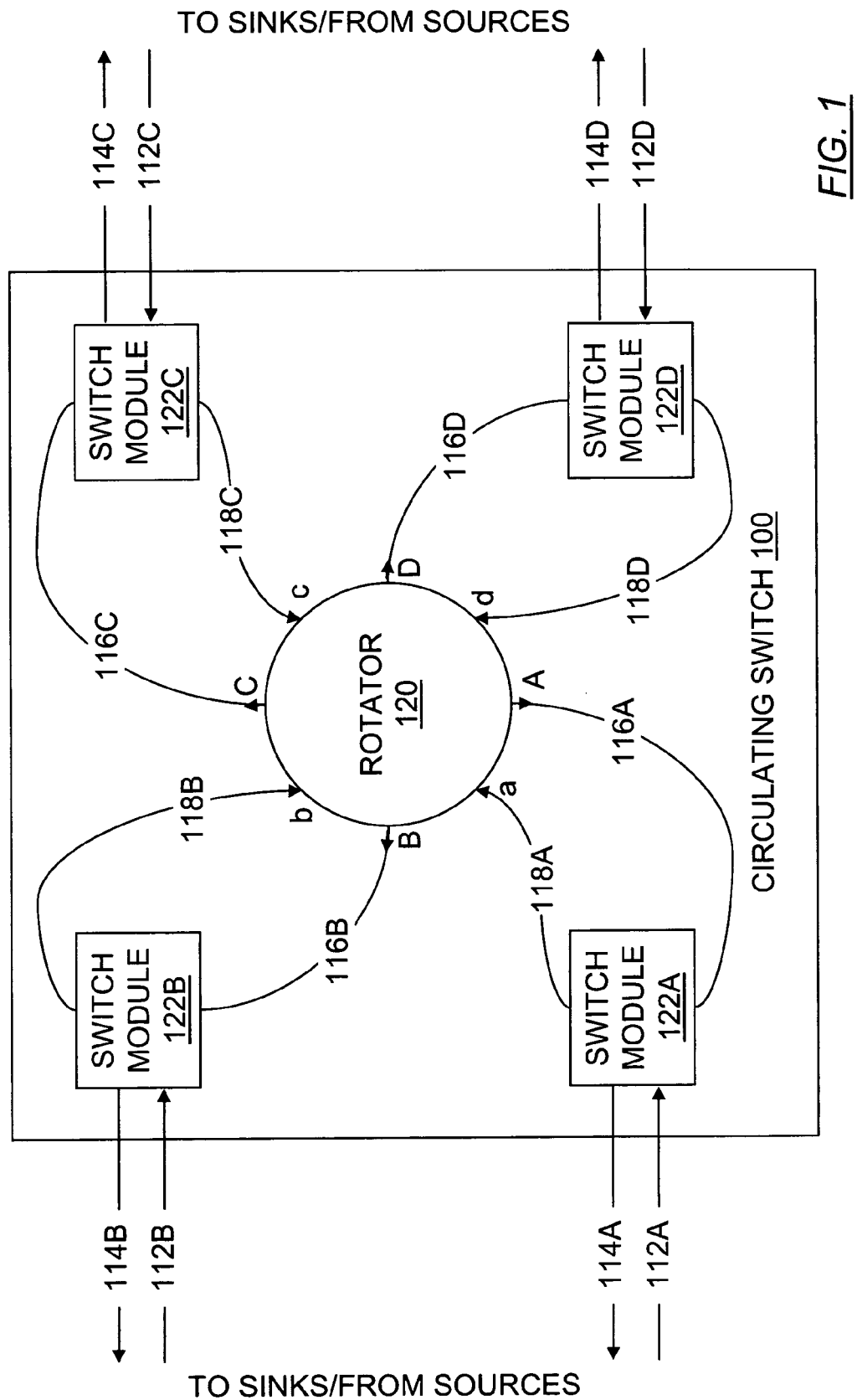
FIG. 1 illustrates the architecture of a one-dimensional circulating switch using a single rotator and four switch modules.

FIG. 1 illustrates a one-dimensional circulating switch 100 having plurality of switch modules including a first switch module 122A, a second switch module 122B, a third switch module 122C and a fourth switch module 122D (collectively or individually 122). Each switch module 122 incorporates an ingress switch module and an egress switch module (not individually illustrated). Each switch module 122 cyclically accesses each other switch module 122 during an access phase of a predefined duration in a rotation cycle. A rotator 120 may be used to cyclically interconnect switch modules 122. The inlet ports of the rotator 120 are labeled a, b, c, and d and the outlet ports are labeled A, B, C, and D. The rotation cycle of a rotator is defined herein as a period of time during which the rotator connects each of its inlet ports to each of its outlet ports according to a predetermined inlet-outlet connectivity pattern. A rotation cycle includes an integer number of access phases. An access phase is also called a rotation phase. Hereinafter, an inlet port of a rotator is referenced as an inlet and an outlet port is referenced as an outlet for brevity.

The first switch module 122A is electronic-based and receives data from data traffic sources through an ingress link 112A, delivers data to subtending data traffic sinks through an egress link 114A, and connects to the rotator 120 through an inbound channel 116A and an outbound channel 118A. Similarly, each of the other switch modules 122B, 122C, 122D is also electronic-based and receives data from data traffic sources through a corresponding ingress link 112B, 112C, 112D, delivers data to subtending data traffic sinks through a corresponding egress link 114B, 114C, 114D and connects to the rotator 120 through a corresponding inbound channel 116B, 116C, 116D and a corresponding outbound channel 118B, 118C, 118D.

The rotator 120 may have either an electronic fabric or a photonic fabric. A rotator having a photonic fabric requires Electrical-to-Optical (O-E) and Optical-to-Electrical (E-O) interfaces (not illustrated) to interface with links 116 and 118. Such interfaces may be placed at respective switch-module ports or at ports of the photonic fabric. The rotator 120, which functions as a temporal cyclic connector is also referenced hereinafter as a temporal cyclical rotator. The rotator 120 is a passive, memoryless device that provides cyclic interconnection from an inlet (a, b, c, d) to an outlet (A, B, C, D), according to a predefined inlet-outlet connectivity pattern over a predefined rotation cycle. Although FIG. 1 illustrates only four switch modules 122, it is understood that the number of switch modules 122 is physically limited by the number of dual ports on the rotator 120 (a dual port comprising an inlet port and an outlet port) and operationally limited by a systematic transit delay which increases with the number of switch modules 122 as will be described below. The systematic transit delay in the one-dimensional circulating switch 100 is determined by the connectivity of a source switch module and destination switch module to a rotator and is independent of the path taken.

Although FIG. 1 illustrates a single rotator 120, a circulating switch 100 may include an array of rotators operating in parallel, with each inbound link 116A having multiple channels each connecting to an inbound port of switch module 122A, and each outbound links 118A having multiple channels each connecting to an outbound port of switch module 122A. Likewise, each of inbound links 116B, 116C, and 116D has multiple channels each connecting to inbounds ports of switch modules 122B, 122C, and 122D, respectively, and each of outbound links 118B, 118C, and 118D may have multiple channels, each channel connecting to outbound ports of switch modules 122B, 122C, and 122D, respectively. An array of rotators operating in parallel is herein synonymously referenced as a "rotator assembly" or simply a rotator.

An electronic rotator can be constructed to have a relatively large number of dual rotator ports, 16,364, for example. However, delay constraints would limit the number of dual ports to a number of the order of 2,048. The need for a high-capacity rotator to construct a high-capacity switch is eliminated by providing parallel paths for each switch-module pair using a rotor comprising parallel rotators. The parallel rotators preferably have different rotation-phase offsets in order to reduce the mean value of the systematic transit delay as described in the above referenced U.S. patent application Ser. No. 10/780,557. In the two-dimensional circulating switch of the present invention, which will be described hereinafter with reference to FIG. 5, numerous multiple paths are provided through a lattice structure as will be described with reference to FIGS. 6 to 10.

As described above, the inlet-outlet connectivity of a rotator is maintained during each rotation phase of the rotation cycle, where a rotation phase is a period of time during which a rotator maintains a particular inlet-outlet connectivity. For example, a particular rotation cycle may include: a first rotation phase in which inlet 'a' is connected to outlet 'A', inlet 'b' is connected to outlet 'B', inlet 'c' is connected to outlet 'C' and inlet 'd' is connected to outlet 'D'; a second rotation phase in which inlet 'a' is connected to outlet 'B', inlet 'b' is connected to outlet 'C', inlet 'c' is connected to outlet 'D' and inlet 'd' is connected to outlet 'A'; a third rotation phase in which inlet 'a' is connected to outlet 'C', inlet 'b' is connected to outlet 'D', inlet 'c' is connected to outlet 'A' and inlet 'd' is connected to outlet 'B'; and a fourth rotation phase in which inlet 'a' is connected to outlet 'D', inlet 'b' is connected to outlet 'A', inlet 'c' is connected to outlet 'B' and inlet 'd' is connected to outlet 'C'.

Figure 2:
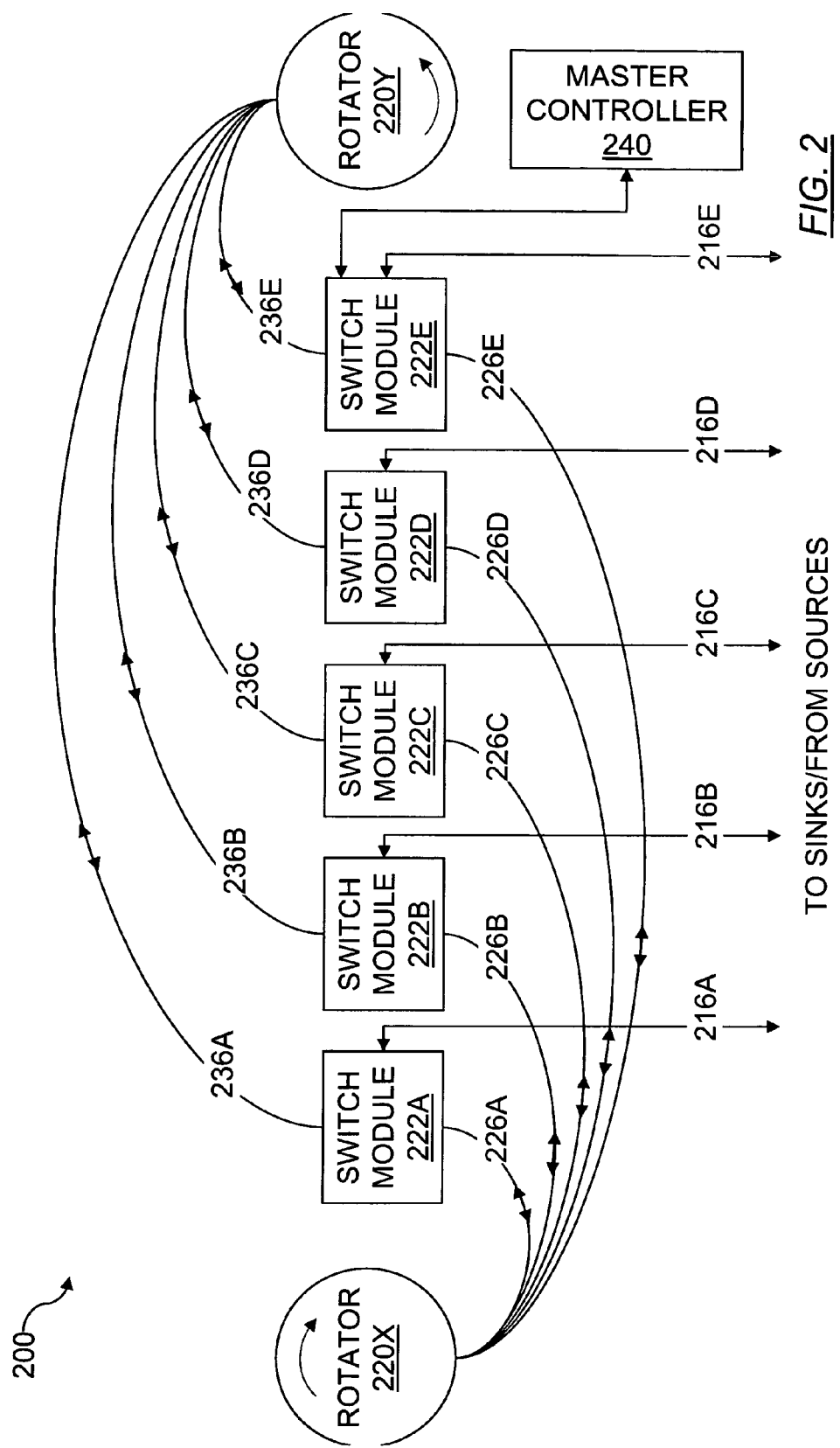
FIG. 2 illustrates the architecture of a one-dimensional circulating switch using two rotators and five switch modules.

FIG. 2 illustrates, in a simplified representation, a one-dimensional circulating switch 200 having a rotor including a first rotator 220X and a second rotator 220Y. Advantageously, the second rotator 220Y may be arranged to have a direction of rotation (i.e., a direction of stepping through the phases of a rotation cycle) opposite to the direction of rotation of the first rotator 220X. In such a case, the second rotator 220Y is described as being "complementary" to the first rotator 220X, and vice versa. Where the first rotator 220X is called a clockwise rotator 220X, the second (complementary) rotator 220Y may be called a counterclockwise rotator 220Y. The extended one-dimensional circulating switch 200 includes a first switch module 222A, a second switch module 222B, a third switch module 222C, a fourth switch module 222D and a fifth switch module 222E (collectively or individually 222).

The channels to a switch module 222 from subtending data sources and to subtending data sinks from the switch module 222 are represented as combined into an external dual channel 216A, 216B, 216C, 216D, 216E corresponding to each of the switch modules 222. The inbound channels from the clockwise rotator 220X to the switch modules 222 and outbound channels from the switch modules 222 to clockwise rotator 220X are represented as combined into a first internal dual channel 226A, 226B, 226C, 226D, 226E corresponding to each of the switch modules 222. Likewise, the inbound channels from the counterclockwise rotator 220Y to the switch modules 222 and the outbound channels from the switch modules 222 to the clockwise rotator 220Y are represented as combined into a second internal dual channel 236A, 236B, 236C, 236D, 236E corresponding to each of the switch modules 222.

As will become clear in the following, in a common memory device provided in each switch module 222, there may be a transit section corresponding to each of the two rotators 220X, 220Y. Data received at the first switch module 222A for transfer to the second switch module 222B through the first rotator 220X may be written to a corresponding first transit section in the common memory of the first switch module 222A. Likewise, data to be transferred through the second rotator 220Y may be written in a corresponding second transit section in the common memory of the first switch module 222A. However, data read out from the first transit section may be transferred through the second rotator 220Y, and vice versa. It can be shown that the connection of the first switch module 222A to the second switch module 222B through an intermediate switch module (say, the third switch module 222C) and traversing the complementary rotators 220X, 220Y results in a desirable fixed delay that is specific to each directed switch module pair (a source switch module and a destination switch module) independent of the intermediate switch module.

Control of the one-dimensional switch module 200 is provided by a master controller 240 communicatively connected to a predetermined switch module 222E dedicated for the purpose of transferring control instructions to the other switch modules 222, via the rotators 220. Each switch module 222 is provided with a module controller (not illustrated) which is communicatively coupled to the master controller 240 and maintains a connectivity-pattern matrix for each of rotators 220.

In particular, the clockwise rotator 220X and the counterclockwise rotator 220Y are illustrated at the left and right ends, respectively, of an array of the switch modules 222. The first internal dual channels 226 connect each of the switch modules 222 to the clockwise rotator 220X and the second internal dual channels 236 connect each of the switch modules 222 to the counterclockwise rotator 220Y.

The external dual channels 216A, 216B, 216C, 216D, 216E corresponding to each of the switch modules 222, connect the switch modules 222 to subtending data sources and to subtending data sinks. Furthermore, the master controller 240 is communicatively connected to the predetermined switch module 222E.

Figure 3:
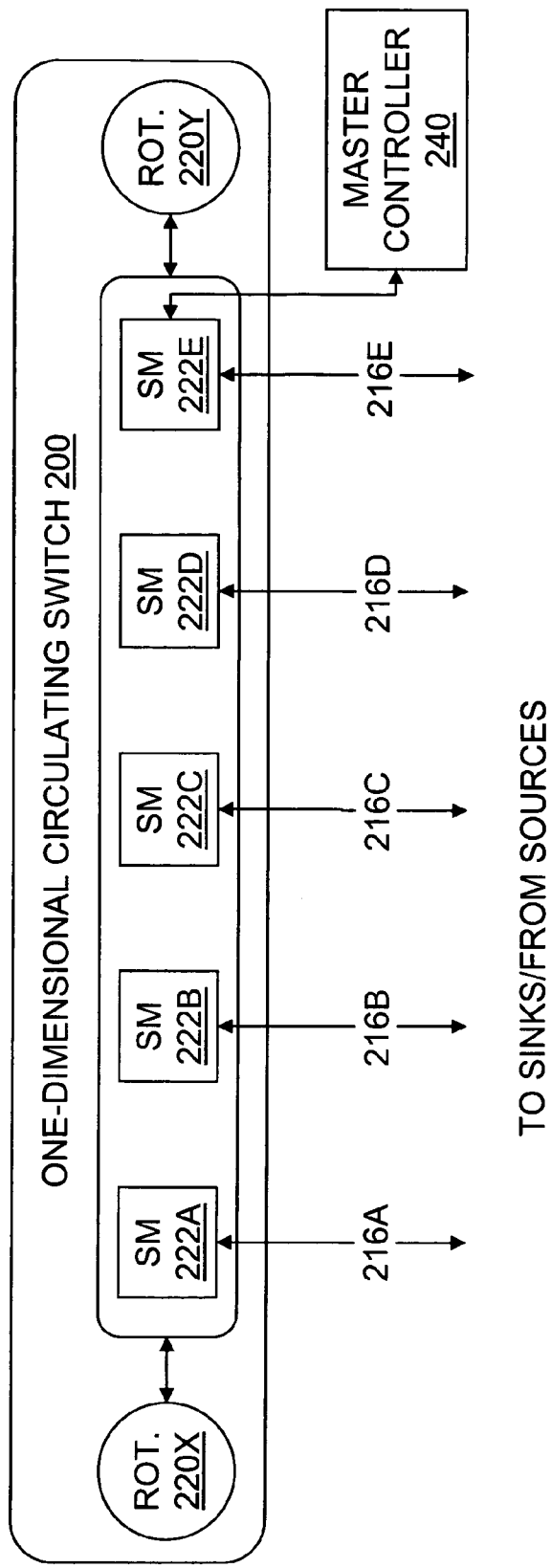
FIG. 3 illustrates, in a concise representation, the one-dimensional circulating switch of FIG. 2.

The arrayed representation of the one-dimensional circulating switch 200 in FIG. 2 is concisely represented in FIG. 3 to remove the explicit connections between the switch modules 222 and the rotators 220X, 220Y. It is understood that each of the switch modules 222A, 222B, 222C, 222D, and 222E has a channel to an inlet of rotator 220X, a channel from an outlet of rotator 220X, a channel to an inlet of rotator 220Y, and a channel from an outlet of rotator 220Y.

Figure 4:
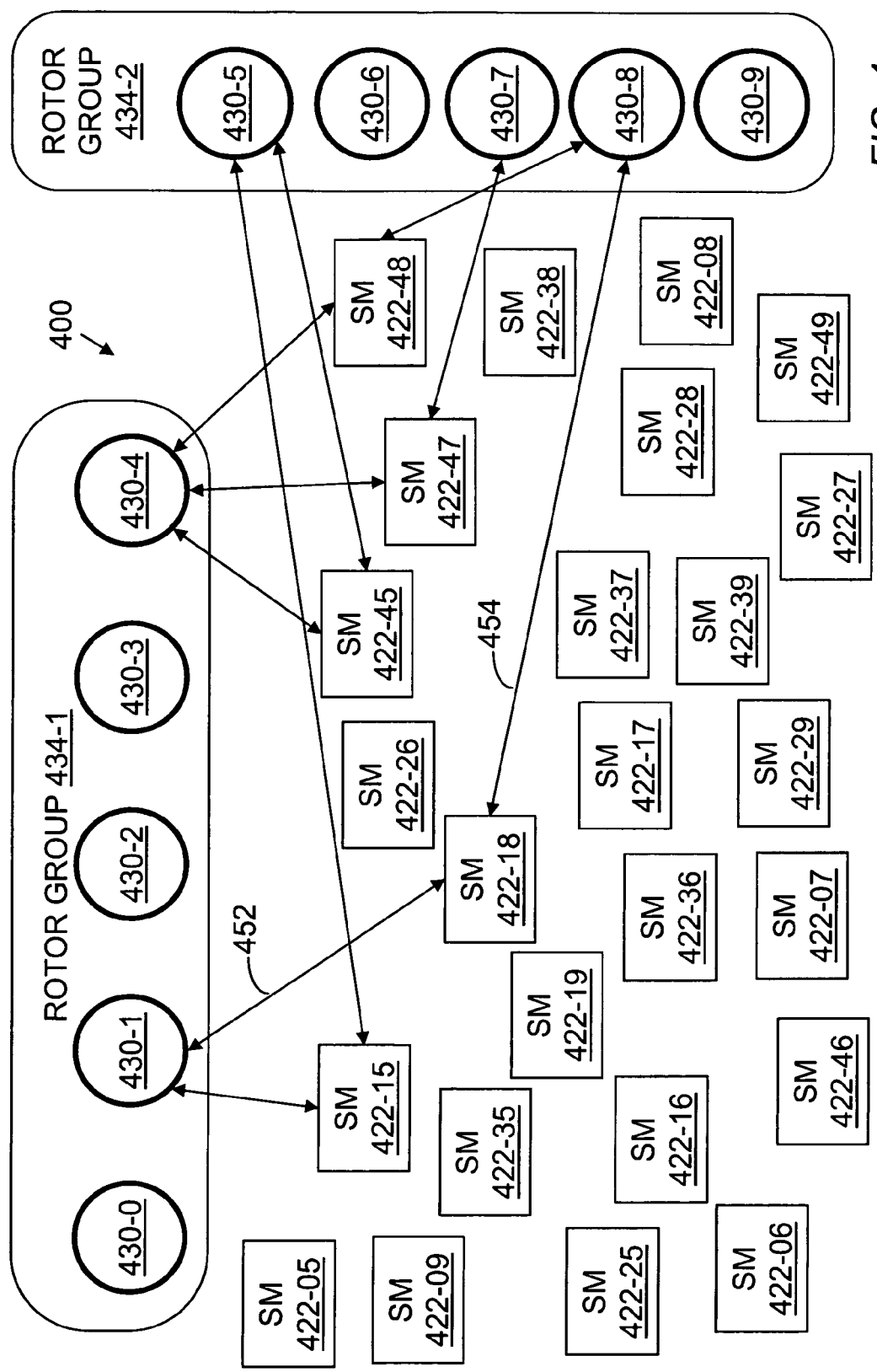
FIG. 4 illustrates a configuration of a two-dimensional circulating switch comprising ten rotors and twenty-five switch modules, where the rotors are arranged in a first group of five rotors and a second group of five rotors, and each switch module connects to a rotor in the first group of rotors and a rotor in the second group of rotors, in accordance with an embodiment of the present invention.

FIG. 4 illustrates a two-dimensional circulating switch 400 comprising ten rotors 430-0 to 430-9 (collectively or individually 430) and 25 switch modules 422. Each rotor 430 may include an array of rotators such as the rotators 220X, 220Y of FIG. 2 (not individually illustrated in FIG. 4). As illustrated, each rotor 430 has a dual link to each of a subset of switch modules 422. A rotor comprises at least one rotator each rotator having a number of input ports and an equal number of output ports and the input-output connectivity may follow either of two directions; clockwise or counterclockwise. When a rotor 430 has two or more rotators, the rotator may have different rotation shifts and different rotation directions. Each rotor 430 is associated with a subset of switch modules 430 and has a dual link to each switch module 430 in the associated subset of switch modules; the dual link includes a dual channel from each rotator in the rotor.

The rotors 430 are arranged in the two-dimensional circulating switch 400 of FIG. 4 such that they are divided among two groups: a first rotor group 434-1; and a second rotor group 434-2. The first rotor group 434-1 includes five rotors 430-0, 430-1, 430-2, 430-3, 430-4 and the second rotor group 434-2 includes the other five rotors 430-5, 430-6, 430-7, 430-8, 430-9. There are 25 switch modules 422 in the example of FIG. 4. Each switch module 422 has a dual link 452 to a rotor 430 in the first rotor group 434-1 and a dual link 454 to a rotor 430 in the second rotor group 434-2. So that a dual link need not be illustrated for each of the 25 switch modules, a switch module 422 connecting to a rotor 430-x in the first rotor group 434-1 and a rotor 430-y in the second rotor group 434-2 is identified in FIG. 4 as 430-xy.

The switch of FIG. 4 is arranged such that any two switch modules 422 that connect to a common rotor 430 in the first rotor group 434-1 connect to different rotors in the second rotor group 434-2 and vice versa. Each rotor 430 in the first rotor group 434-1 connects to five switch modules 422 and each rotor 430 in the second rotor group 434-2 connects to five switch modules 422. A rotor 430 in the second rotor group 434-2 and its five associated switch modules 422 form a one-dimensional circulating switch as described in the aforementioned U.S. patent application Ser. No. 10/780,557. Likewise, a rotor 430 in the first rotor group 434-1 and its five associated switch modules 422 form a one-dimensional circulating switch. Thus, each switch module is a member of two one-dimensional circulating switches.

Figure 5:
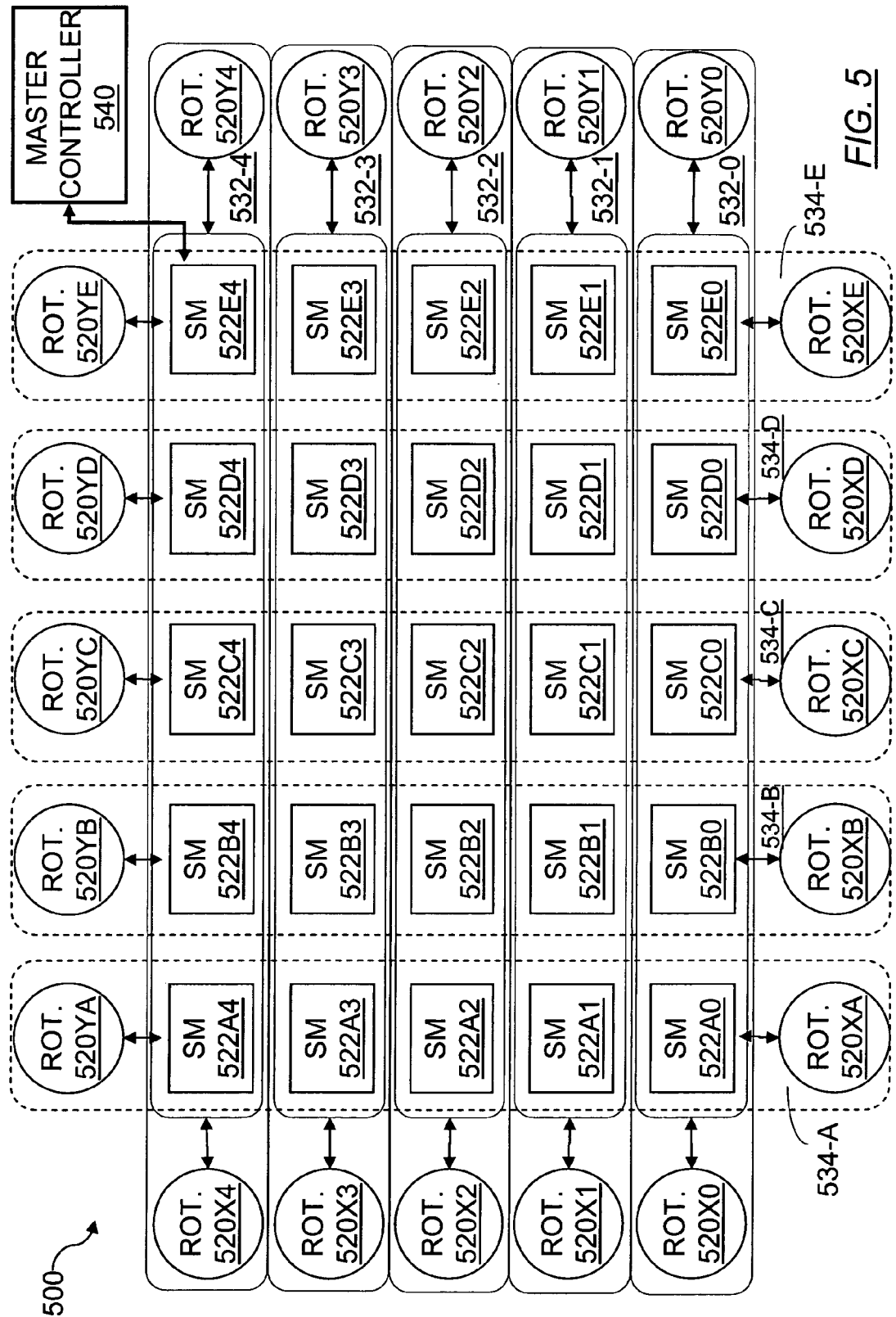
FIG. 5 illustrates a two-dimensional circulating switch wherein switch modules are arranged in five primary, concisely represented, one-dimensional circulating switches and five secondary, concisely represented, one-dimensional circulating switches and wherein each switch module is part of one of the primary one-dimensional circulating switches and one of the secondary one-dimensional circulating switches according to an embodiment of the present invention.

FIG. 5 illustrates a two-dimensional circulating switch 500 of FIG. 5 having a uniform arrangement, but otherwise having the same structure of the two-dimensional circulating switch 400 of FIG. 4. In the two-dimensional circulating switch 500 of FIG. 5, a plurality of switch modules 522 is arranged in five "primary", concisely represented, one-dimensional circulating switches 532 and five "secondary", concisely represented, one-dimensional circulating switches 534, wherein each switch module 522 is part of one of the primary one-dimensional circulating switches 532 and one of the secondary one-dimensional circulating switches 534.

A first primary, concisely represented, one-dimensional circulating switch 532-0 includes a set of similarly indexed switch modules 522A0, 522B0, 522C0, 522D0, 522E0, a corresponding primary clockwise rotator 520X and a corresponding primary counterclockwise rotator 520Y0.

A second primary, concisely represented, one-dimensional circulating switch 532-1 includes a set of similarly indexed switch modules 522A1, 522B1, 522C1, 522D1, 522E1, a corresponding primary clockwise rotator 520X1 and a corresponding primary counterclockwise rotator 520Y1.

A third primary, concisely represented, one-dimensional circulating switch 532-2 includes a set of similarly indexed switch modules 522A2, 522B2, 522C2, 522D2, 522E2, a corresponding primary clockwise rotator 520X2 and a corresponding primary counterclockwise rotator 520Y2.

A fourth primary, concisely represented, one-dimensional circulating switch 532-3 includes a set of similarly indexed switch modules 522A3, 522B3, 522C3, 522D3, 522E3, a corresponding primary clockwise rotator 520X3 and a corresponding primary counterclockwise rotator 520Y3.

A fifth primary, concisely represented, one-dimensional circulating switch 532-4 includes a set of similarly indexed switch modules 522A4, 522B4, 522C4, 522D4, 522E4, a corresponding primary clockwise rotator 520X4 and a corresponding primary counterclockwise rotator 520Y4.

A first secondary, concisely represented, one-dimensional circulating switch 534A includes a set of similarly indexed switch modules 522A0, 522A1, 522A2, 522A3, 522A4, a corresponding secondary clockwise rotator 520XA and a corresponding secondary counterclockwise rotator 520YA.

A second secondary, concisely represented, one-dimensional circulating switch 534B includes a set of similarly indexed switch modules 522B0, 522B1, 522B2, 522B3, 522B4, a corresponding secondary clockwise rotator 520XB and a corresponding secondary counterclockwise rotator 520YB.

A third secondary, concisely represented, one-dimensional circulating switch 534C includes a set of similarly indexed switch modules 522C0, 522C1, 522C2, 522C3, 522C4, a corresponding secondary clockwise rotator 520XC and a corresponding secondary counterclockwise rotator 520YC.

A fourth secondary, concisely represented, one-dimensional circulating switch 534D includes a set of similarly indexed switch modules 522D0, 522D1, 522D2, 522D3, 522D4, a corresponding secondary clockwise rotator 520XD and a corresponding secondary counterclockwise rotator 520YD.

A fifth secondary, concisely represented, one-dimensional circulating switch 534E includes a set of similarly indexed switch modules 522E0, 522E1, 522E2, 522E3, 522E4, a corresponding secondary clockwise rotator 520XE and a corresponding secondary counterclockwise rotator 520YE.

Control of the two-dimensional circulating switch 500 is provided by a master controller 540 communicatively connected to a predetermined switch module 522E4 dedicated for the purpose of transferring control instructions to the other switch modules 522, via the rotators 520. As will be apparent, master controller 540 may be associated with any other switch module 522. Each switch module 522 has a module controller (not illustrated) which stores a rotator-connectivity matrix, to be described with reference to FIG. 24, corresponding to each rotator 520 with which the switch module is associated. Each module controller is communicatively coupled to the master controller 540.

Figure 6:
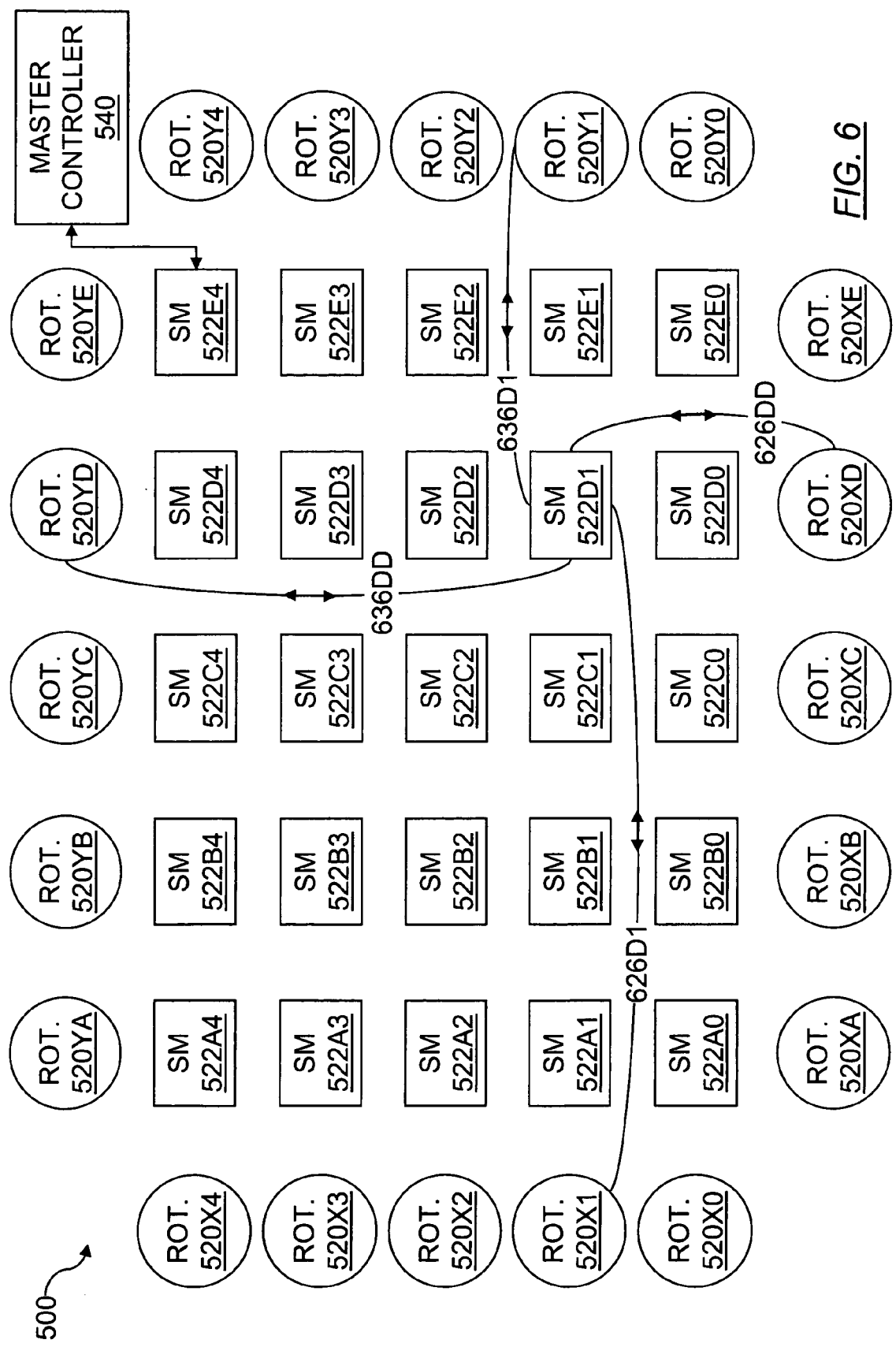
FIG. 6 illustrates a simplified view of the two-dimensional circulating switch of FIG. 5, wherein connectivity between a selected switch module and corresponding rotators is illustrated.

An example of the connections maintained by each of the switch modules 522 in the two-dimensional circulating switch 500 is illustrated in FIG. 6 to include a first internal dual channel 626D1 connecting the switch module 522D1 to the corresponding horizontal clockwise rotator 520X1 and a second internal dual channel 636D1 connecting the switch module 522D1 to the corresponding primary counterclockwise rotator 520Y1. Similarly, a first internal dual channel 626DD connects the switch module 522D1 to the corresponding secondary clockwise rotator 520XD and a second internal dual channel 636DD connects the switch module 522D1 to the corresponding secondary counterclockwise rotator 520YD.

Figure 7:
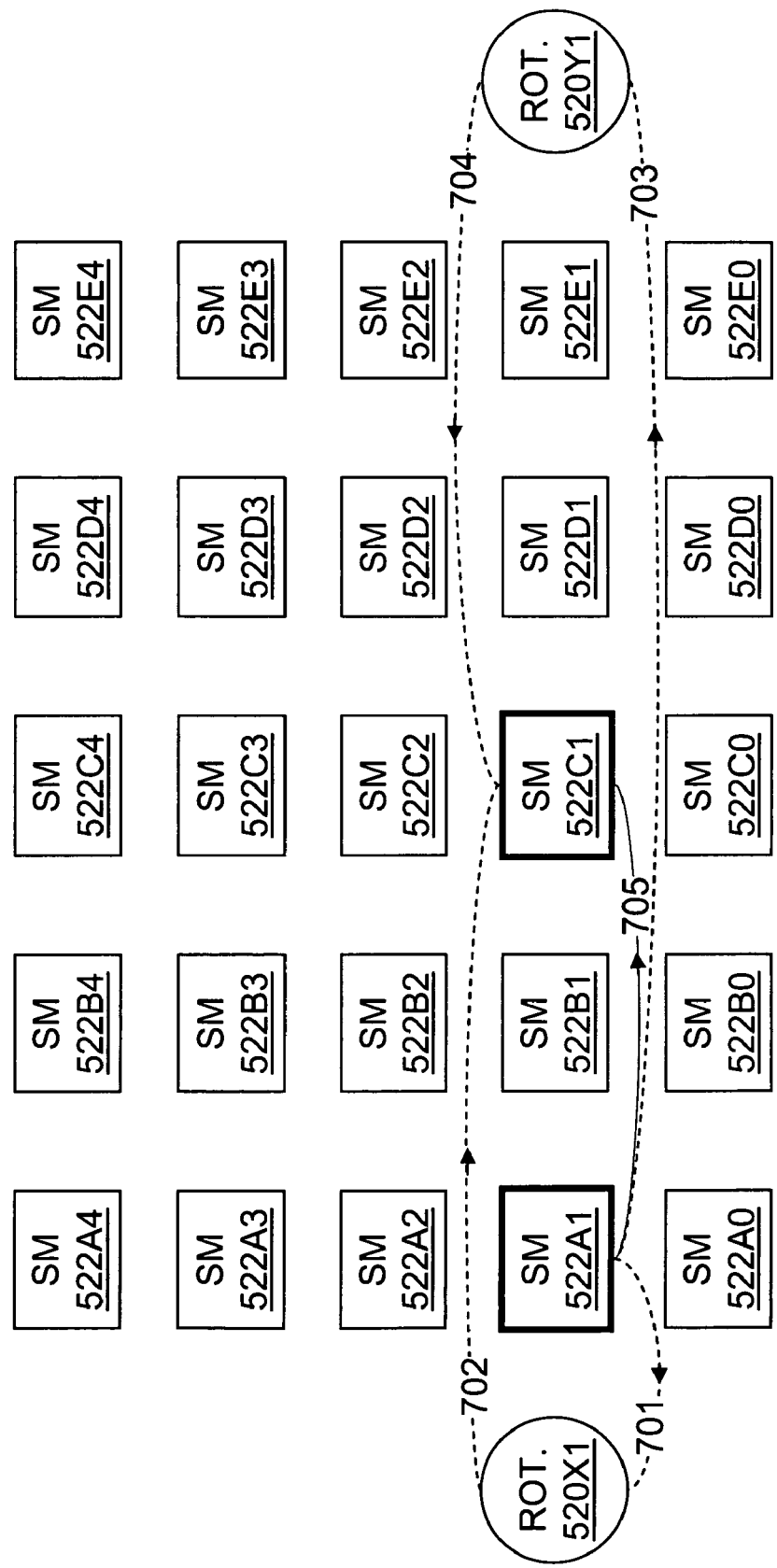
FIG. 7 illustrates a simplified view of the two-dimensional circulating switch of FIG. 5, indicating a representative path set and actual paths between two switch modules.

FIG. 7 illustrates a connection within a primary one-dimensional circulating switch 532-1. A source switch module, 522A1 for example, receives data streams from subtending data traffic sources and organizes the received data streams into data segments. A destination switch module, 522C1 for example, may be determined based on a data traffic sink associated with one or more of the data segments formed from the received data streams.

Since the destination switch module 522C1 and the source switch module 522A1 are part of a common, primary, one-dimensional circulating switch 532-1, the transfer of data takes place either directly or through intermediate switch modules 522 within the one-dimensional circulating switch 532-1 as detailed in the aforementioned U.S. patent application Ser. No. 10/780,557. Direct transfer may take place in two rotation phases of the rotation cycle. A direct transfer of data segments from the source switch module 522A1 to the destination switch module 522C1 is represented by direct zero-order path-set 705, between the source switch module 522A1 and the destination switch module 522C1. Direct path-set 705 includes a path through the clockwise rotator 522X1 and a path through the counterclockwise rotator 522Y1.

In one rotation phase of the rotation cycle associated with a rotator 520X1 of the common, primary, one-dimensional circulating switch 532-1, a data segment destined for a data traffic sink associated with the destination switch module 522C1 may be transmitted, by the source switch module 522A1, to the selected rotator 520X1 (on path 701) through which the data segment passes directly on the way to the destination switch module 522C1 (on path 702).

Similarly, in one rotation phase of the rotation cycle associated with a rotator 520Y1 of the common, primary, one-dimensional circulating switch 532-1, a data segment destined for a data traffic sink associated with the destination switch module 522C1 may be transmitted, by the source switch module 522A1, to the selected rotator 520Y1 (on path 703) through which the data segment passes directly on the way to the destination switch module 522C1 (on path 704).

As described, there are two zero-order routes from switch module 522A1 to switch module 522C1, one route traversing paths 701 and 702 and the other route traversing paths 703 and 704. The number of zero-order routes, each traversing one rotator 520, from a first switch module 522 to a second switch module 522 where the first and second switch modules belong to a common one-dimensional circulating switch (primary or secondary) equals the number of rotators associated with the common one-dimensional circulating switch. The zero-order routes for each directed switch-module pair having a common one-dimensional circulating switch (532 or 534) may be sorted according to their systematic transit delay.

Figure 8:
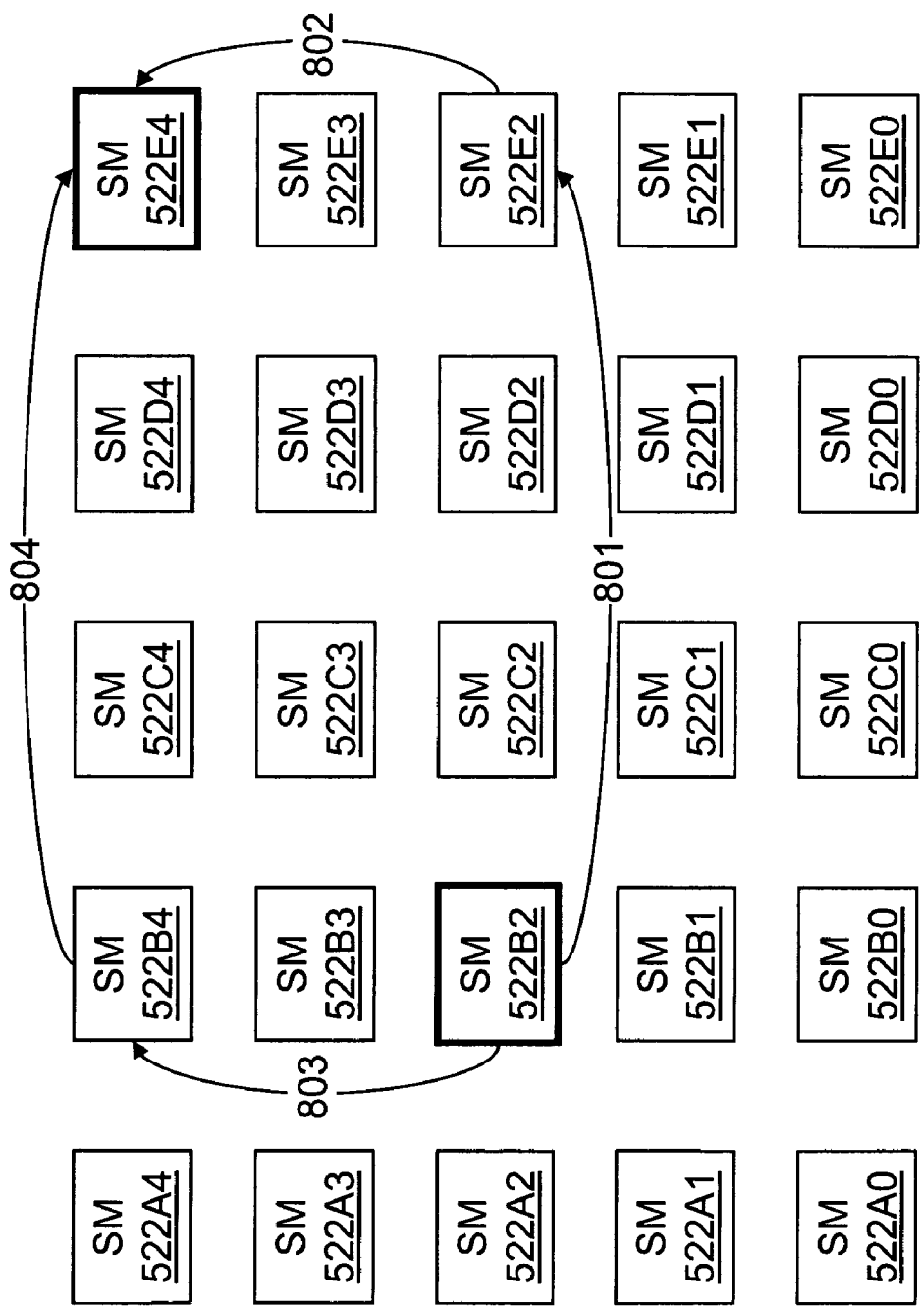
FIG. 8 illustrates a simplified view of the two-dimensional circulating switch of FIG. 5, showing two routes between two switch modules, where each of the two routes traverses two paths according to an embodiment of the present invention.

FIG. 8 illustrates a case where the source switch module (say, switch module 522B2) and the destination switch module (say, switch module 522E4) are not part of a common one-dimensional circulating switch (either secondary or primary). In a specific rotation phase of the rotation cycle associated with a selected rotator of the primary, one-dimensional circulating switch 532-2 to which the source switch module 522B2 belongs, a data segment destined for a data traffic sink associated with the destination switch module 522E4 may be transmitted, by the source switch module 522B2, directly through a selected rotator to an intermediate switch module 522E2 belonging to the one-dimensional circulating switch 532-2 using one of two paths in path-set 801; one of the two paths traverses rotator 420X2 and the other traverses rotator 520Y2.

Intermediate switch module 522E2 and destination switch module 522E4 belong to secondary one-dimensional circulating switch 534E which includes rotators 520XE and 520YE. In a rotation phase, following the above specific rotation phase, intermediate switch module 522E2 may directly transmit to destination switch module 522E4 the data segment destined for a data traffic sink associated with switch module 522E4 through either a path traversing rotator 520XE or a path traversing rotator 520YE (i.e., path-set 802).

Alternatively, in a particular rotation phase of the rotation cycle associated with a selected rotator of the secondary, one-dimensional circulating switch 534B of which the source switch module 522B2 is a part, a data segment destined for a data traffic sink associated with the destination switch module 522E4 may be transmitted, by the source switch module 522B2, directly through the selected rotator to an alternative intermediate switch module 522B4 (path-set 803).

Intermediate switch module 522B4 and destination switch module 522E4 belong to primary one-dimensional circulating switch 532-4 which includes rotators 520X4 and 520Y4. In a rotation phase, following the above particular rotation phase, intermediate switch module 522B4 may directly transmit to destination switch module 522E4 the data segment destined for a data traffic sink associated with switch module 522E4 through either rotator 520X4 or rotator 520Y4 (path-set 804).

Each of path-sets 801, 802, 803, and 804 includes two paths, one through each of the two rotators of a one-dimensional circulating switch 532 or 534. Thus, the total number of intersecting first-order routes between the source switch module 522B2 and the destination switch module 522E4 is eight and the number of non-intersecting first-order routes is four. The number of first-order routes in a first-order route set for a directed switch-module pair (a directed switch-module pair is defined by a source switch module and a destination switch module) is determined by the number of rotators in the rotators traversed by the first-order route set. For example, if each rotor has four rotators, the number of intersecting first-order routes in a first-order route set for a directed switch-module pair belonging to different primary circulating switches 532 and different secondary switch modules 534 would be 32 and the number of non-intersecting first-order routes would be eight. The first-order routes for each directed switch-module pair may be sorted according to their associated systematic transit delay to facilitate connection scheduling.

The number of non-intersecting first-order routes from a source switch module 522 to a destination switch module 522 belonging to a common one-dimensional circulating switch (primary or secondary) having v>2 switch modules 522 and $\chi$ rotators is $\chi \times (v-2)$. In the configuration of FIG. 5, $\chi=2$ and v=5, yielding six non-intersecting first-order routes.

When data segments are transferred in a two-dimensional circulating switch 500 using a single intermediate switch module, a "first-order temporal matching" process, also called a first-order vacancy-matching process, may be used to determine available rotation phases along a path from the source switch module to an intermediate switch module and a path from the intermediate switch module to the destination switch module. In the example of FIG. 8, a first-order temporal matching process allocates a free rotation phase (access phase) along a path in path set 801 and a corresponding rotation phase along a path in path set 802. Alternatively, the first-order temporal matching process may allocate a free rotation phase along a path in path set 803 and a corresponding rotation phase along path 804. It is noted that path set 801 comprises a path from switch module 522B2 to switch module 522E2 traversing rotator 520X2 and a path from switch module 522B2 to switch module 522E2 traversing rotator 520Y2. Likewise, path set 802 comprises two paths from switch module 522E2 to switch module 522E4 one path traversing rotator 520XE and the other path traversing switch module 520YE. Similarly, path set 803 includes paths traversing rotators 520XB and 520YB and path set 804 includes paths traversing rotators 520X4 and 520Y4.

Figure 9:
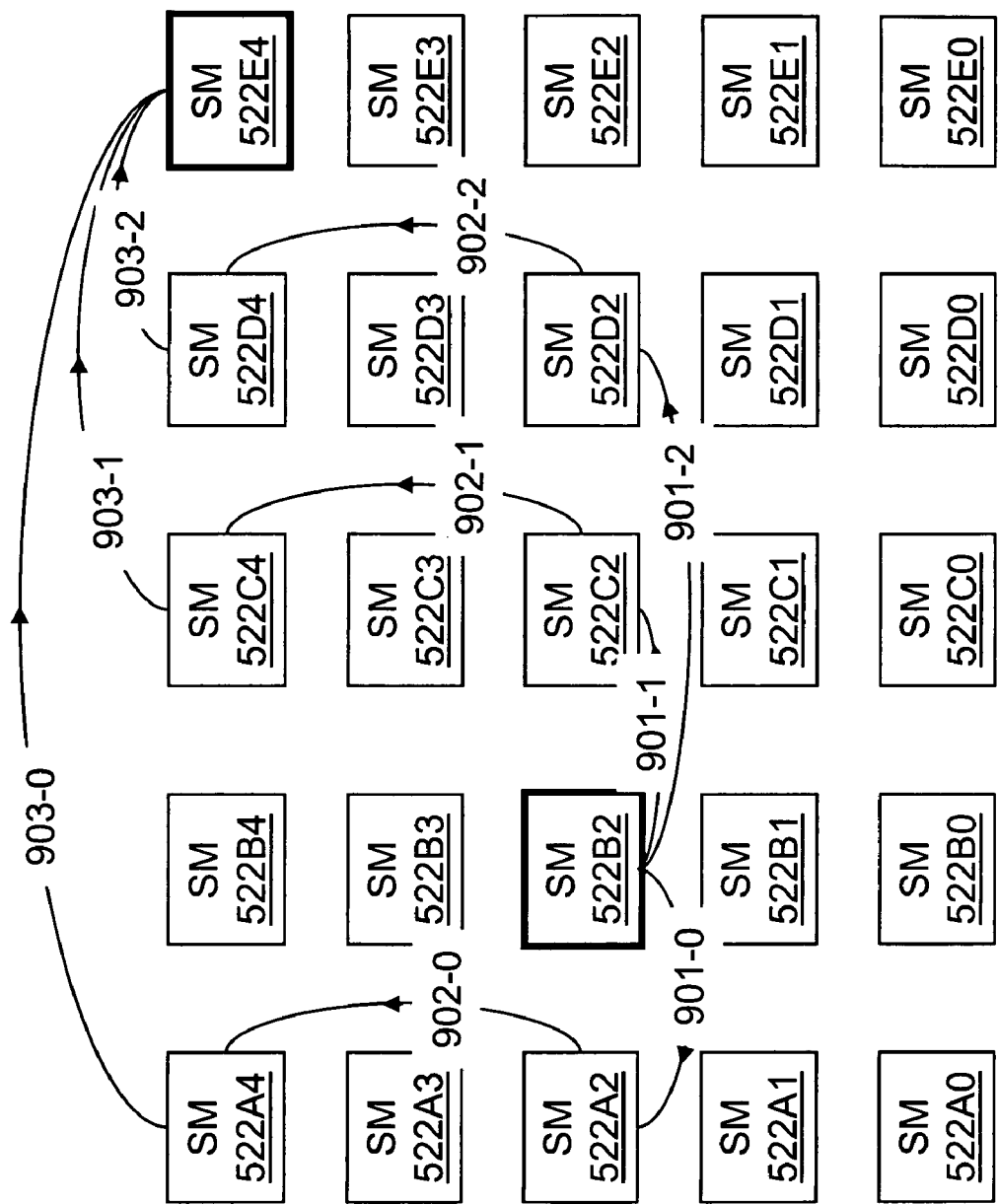
FIG. 9 illustrates a simplified view of the two-dimensional circulating switch of FIG. 5, wherein three routes between two switch modules are shown, where each of the three routes traverses three paths according to an embodiment of the present invention, and a first path in each route is made through a primary one-dimensional circulating switch.
Figure 10:
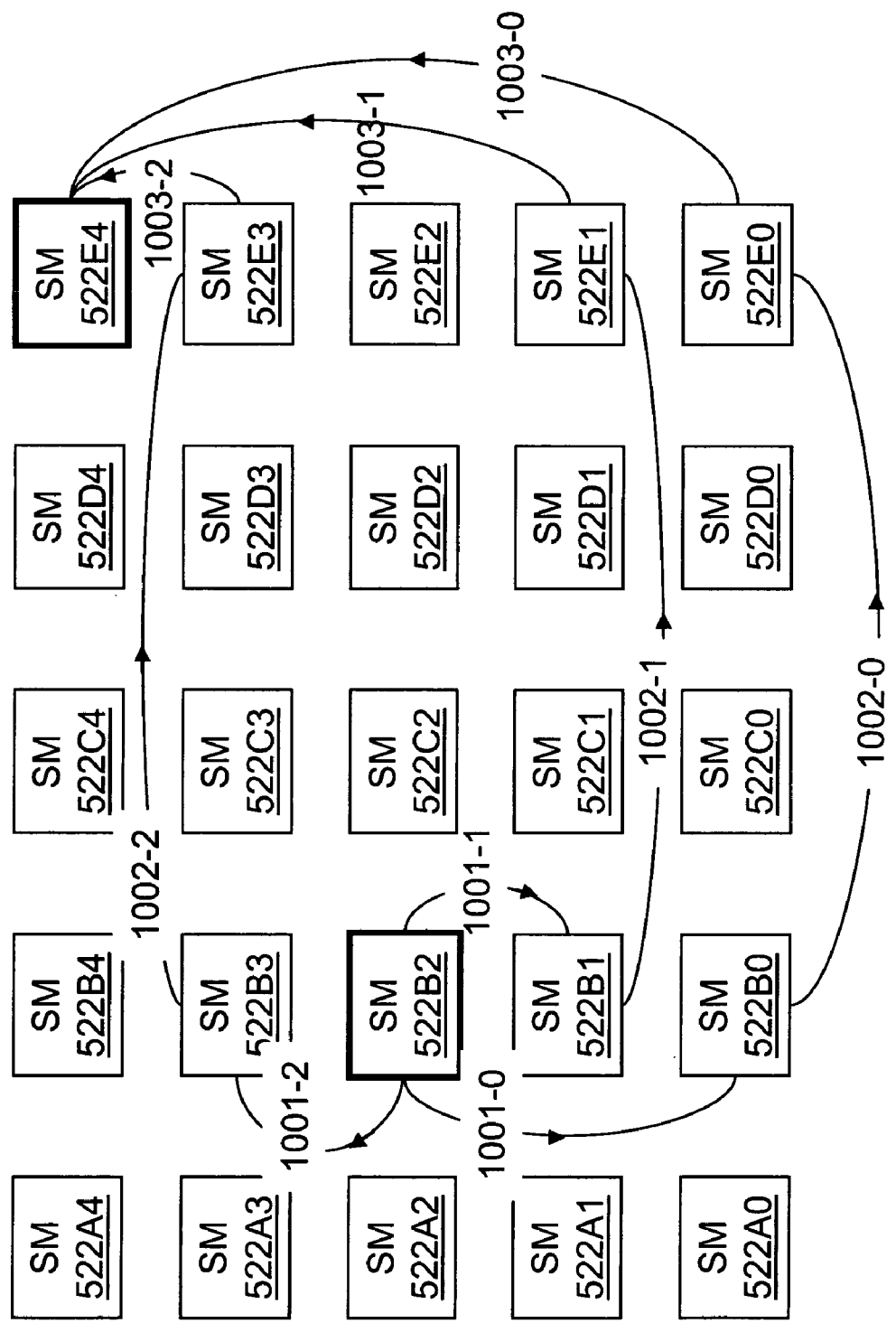
FIG. 10 illustrates a simplified view of the two-dimensional circulating switch of FIG. 5, wherein three routes between two switch modules are shown, where each of the three routes traverses three paths according to an embodiment of the present invention, and a first path in each route is made through a secondary one-dimensional circulating switch.

FIG. 9 illustrates a simplified view of the two-dimensional circulating switch 500 of FIG. 5, wherein data segments are transferred in the two-dimensional circulating switch 500 using two intermediate switch modules. FIG. 10 illustrates another simplified view of the two-dimensional circulating switch 500 of FIG. 5, wherein data segments are transferred in the two-dimensional circulating switch 500 using two intermediate switch modules. In the examples of FIG. 9 and FIG. 10, the source switch module is 522B2 and the sink (destination) switch module is 522E4.

When data segments are transferred in a two-dimensional circulating switch 500 using two intermediate switch modules, a "second-order temporal matching" (a second-order vacancy matching) process may be used to determine available rotation phases along a path from the source switch module to a first intermediate switch module, a path from the first intermediate switch module to a second intermediate switch module, and a path from the second intermediate switch module to the destination switch module. In the example of FIG. 9, a second-order temporal matching process may allocate a free rotation phase (access phase) along a path in path set 901 to switch module 522D2, a corresponding rotation phase along a path in path set 902 from switch module 522D2 to switch module 522D4, and a corresponding rotation phase along a path in path set 903 from switch module 522D4 to destination switch module 522E4. Several other routes from source switch module 522B2 to destination switch module 522E4, each traversing two intermediate switch modules, may be considered. In a two-dimensional structure 500 having m>2 rows and n>2 columns (i.e., m primary one-dimensional circulating switches 532 and n secondary two-dimensional circulating switches 534), there are, between a source switch module and a destination switch module belonging to different rows and columns, two first-order route sets each traversing a single intermediate switch module and (m+n−4) second order route sets each traversing two intermediate switch modules. There are eight second-order routes for each of the (m+n−4) second order route sets. Thus, in the example of FIG. 5, where m=n=5, there are six second-order route sets each including eight intersecting routes to a total of 48 routes per switch-module pair. Each path in a route is present during a respective rotation phase in the rotation cycle. The number of non-intersecting second-order routes is 12.

It is important to note that a first-order temporal-matching process (a first-order vacancy-matching process) requires comparing two occupancy states while a second-order vacancy-matching process requires comparing three occupancy states. First-order matching and second-order matching will be discussed in further detail below.

A rotation cycle preferably includes a number of rotation phases equal to the number of switch modules 522 minus one. There is no need to have any switch module 522 connect to itself through a rotator because each switch module 522 is considered to have a common memory shared by all inputs and all outputs of the switch module.

Figure 11:
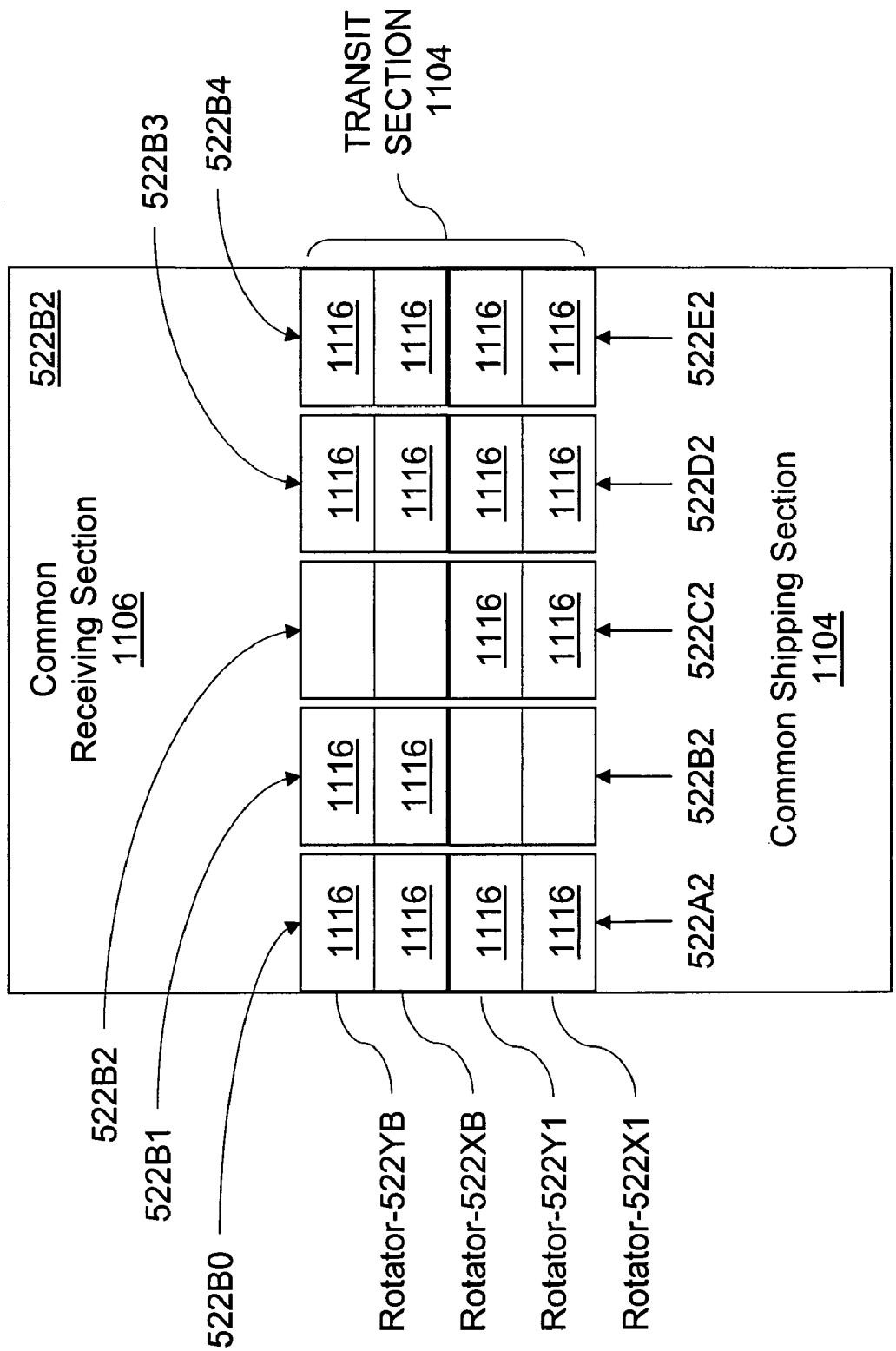
FIG. 11 illustrates the organization of a shared memory in a switch module in the two-dimensional circulating switch of FIG. 5.

FIG. 11 illustrates the organization of a shared data memory in a switch module 522 (FIG. 5). The data memory is logically divided into three sections. A first section 1102, called a shipping section, is used for storing data received directly from data sources. A second section 1104, called a transit section, is used for storing data in transit for switching to other switch modules from among the plurality of switch modules. The second section 1104 is logically divided into a number of sub-sections 1116, each sub-section 1116 corresponding to a particular switch module and a particular rotator. A third section 1106, called a receiving section, is used for storing data segments directly destined for data sinks.

Figure 12:
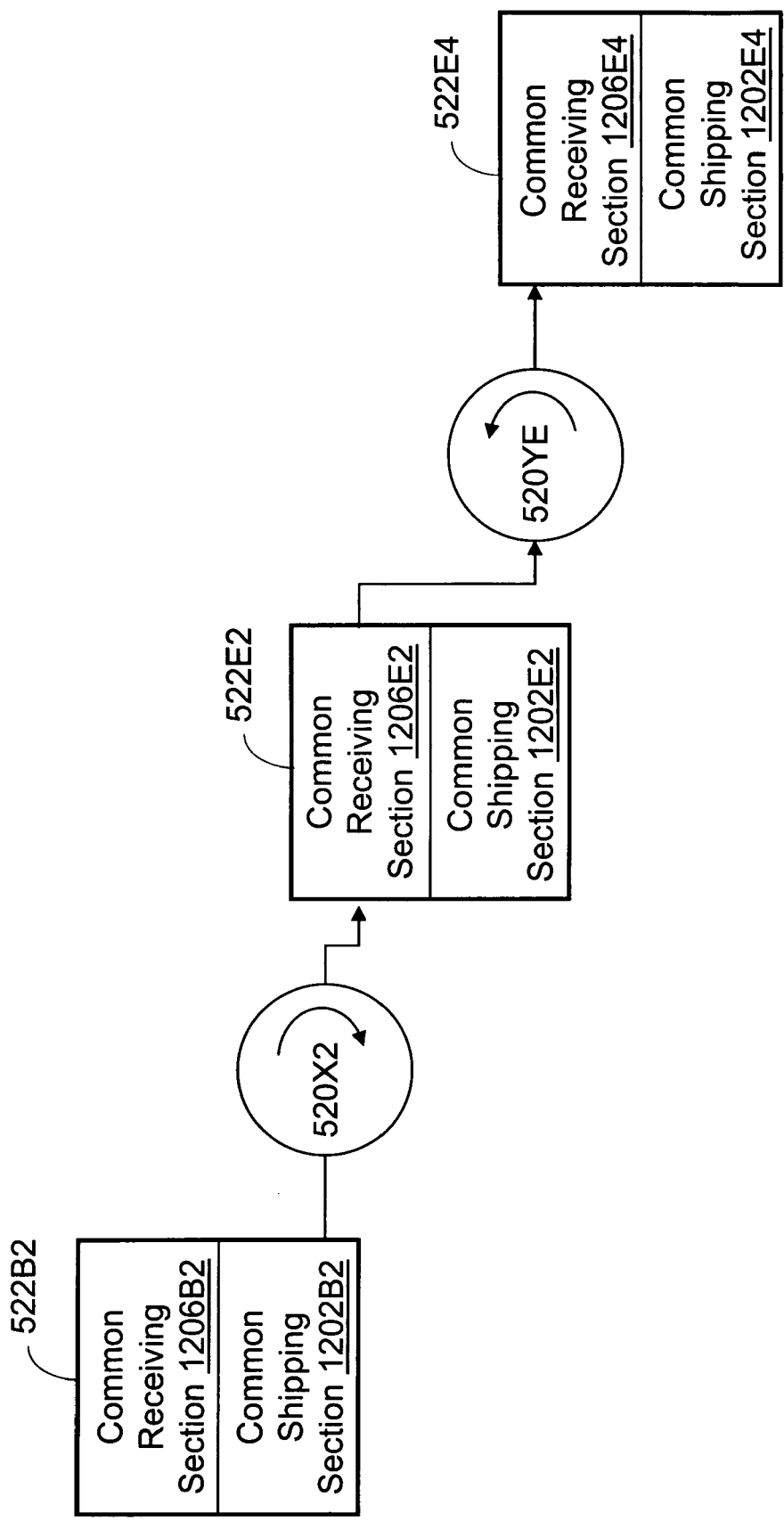
FIG. 12 illustrates a connection traversing two rotators, hence two paths, in a two-dimensional circulating switch where the two paths are decoupled (temporally-independent)

FIG. 12 illustrates a route from source switch module 522B2 to destination switch module 522E4 traversing an intermediate switch module 522E2 and two rotators 520X2 and 520YE in the two-dimensional circulating switch 500 of FIG. 5. Each switch module has a shared memory logically organized in a common shipping section 1202 and a common receiving section 1206: 1202B2, 1206B2 in switch module 522B2; 1202E2, 1226E2 in switch module 522E2; and 1202E4, 1206E4 in switch module 522E4. Transit data received at intermediate switch module 522E2, from source switch module 522B2 through the first rotator 520X2, is placed in the common shipping section 1202E2 of the intermediate switch module 522E2. The transit data is sent by the intermediate switch module 522E2 to the destination switch module 522E4 whenever a path through the second rotator 520YE becomes available. Thus, a connection along the route uses two decoupled temporally-independent paths because the transit data can wait in the intermediate switch module 522E2 for an arbitrary period of time. The use of decoupled paths significantly simplifies connection scheduling. However, this results in unpredictable queuing delay variation which may require buffering data at the destination switch module for a large period of time to collate data units belonging to a common data stream.

Figure 13:
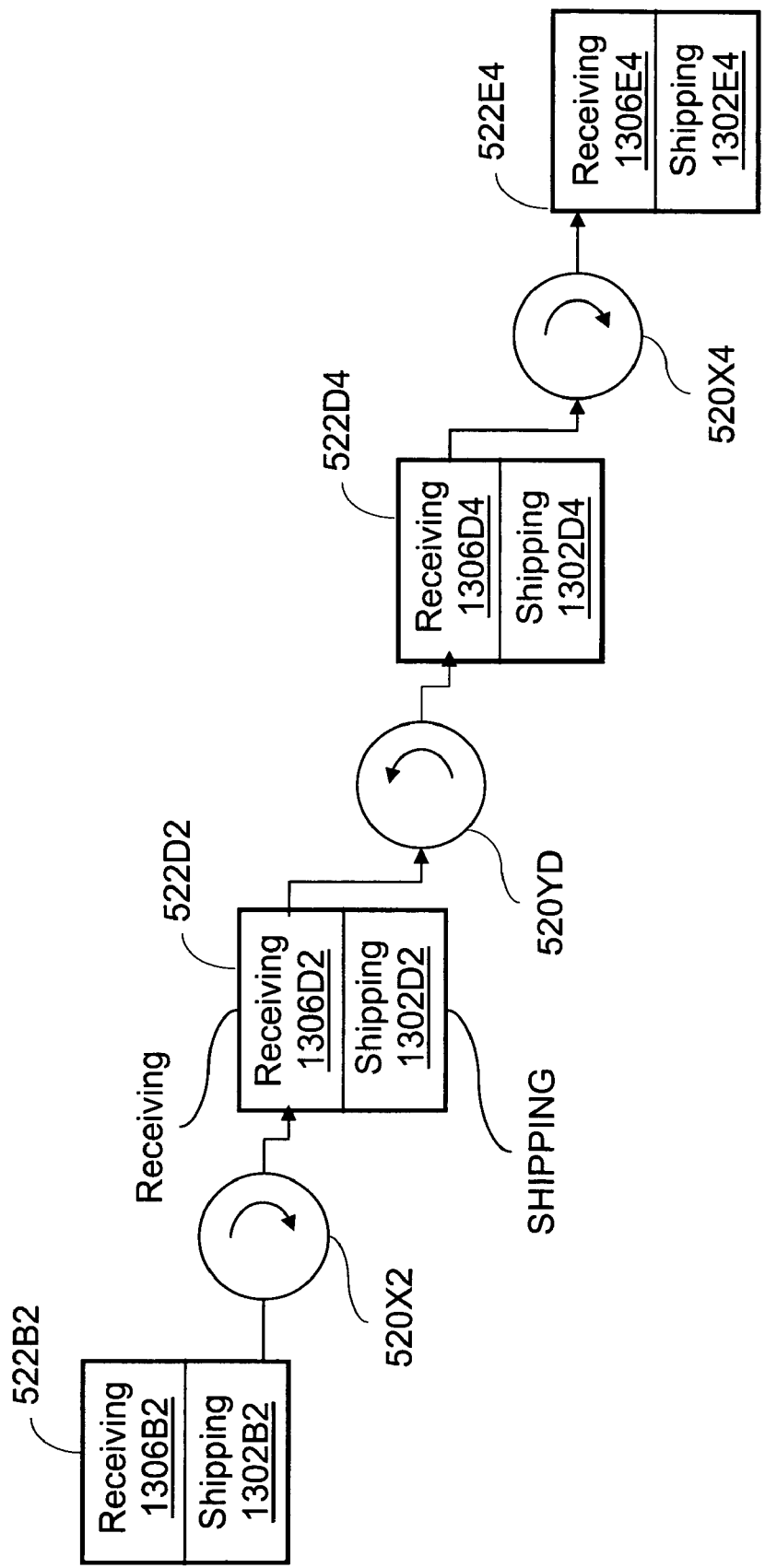
FIG. 13 illustrates a connection traversing three rotators, hence three paths, in a two-dimensional circulating switch where the three paths are decoupled (temporally independent)

FIG. 13 illustrates a route from a source switch module 522B2 to a destination switch module 522E4 traversing two intermediate switch modules 522D2, 522D4 and three rotators 520X2, 520YD, and 520X4 in a two-dimensional circulating switch 500. Each switch module has a shared memory logically organized in a common shipping section 1302 and a common receiving section 1306: 1302B2, 1306B2 in switch module 522B2; 1302D2, 1326D2 in switch module 522D2; 1302D4, 1306D4 in switch module 522D4; and 1302E4, 1306E4 in switch module 522E4. Data sent along the route is held at the shipping sections 1302D2 and 1302D4 of the first and second intermediate switch modules, respectively, and forwarded whenever paths through the second and third rotators 520YD and 520X4 are available. Thus, a connection from a source switch module 522B2 to a destination switch module 522E4 uses three decoupled temporally-independent paths.

Figure 14:
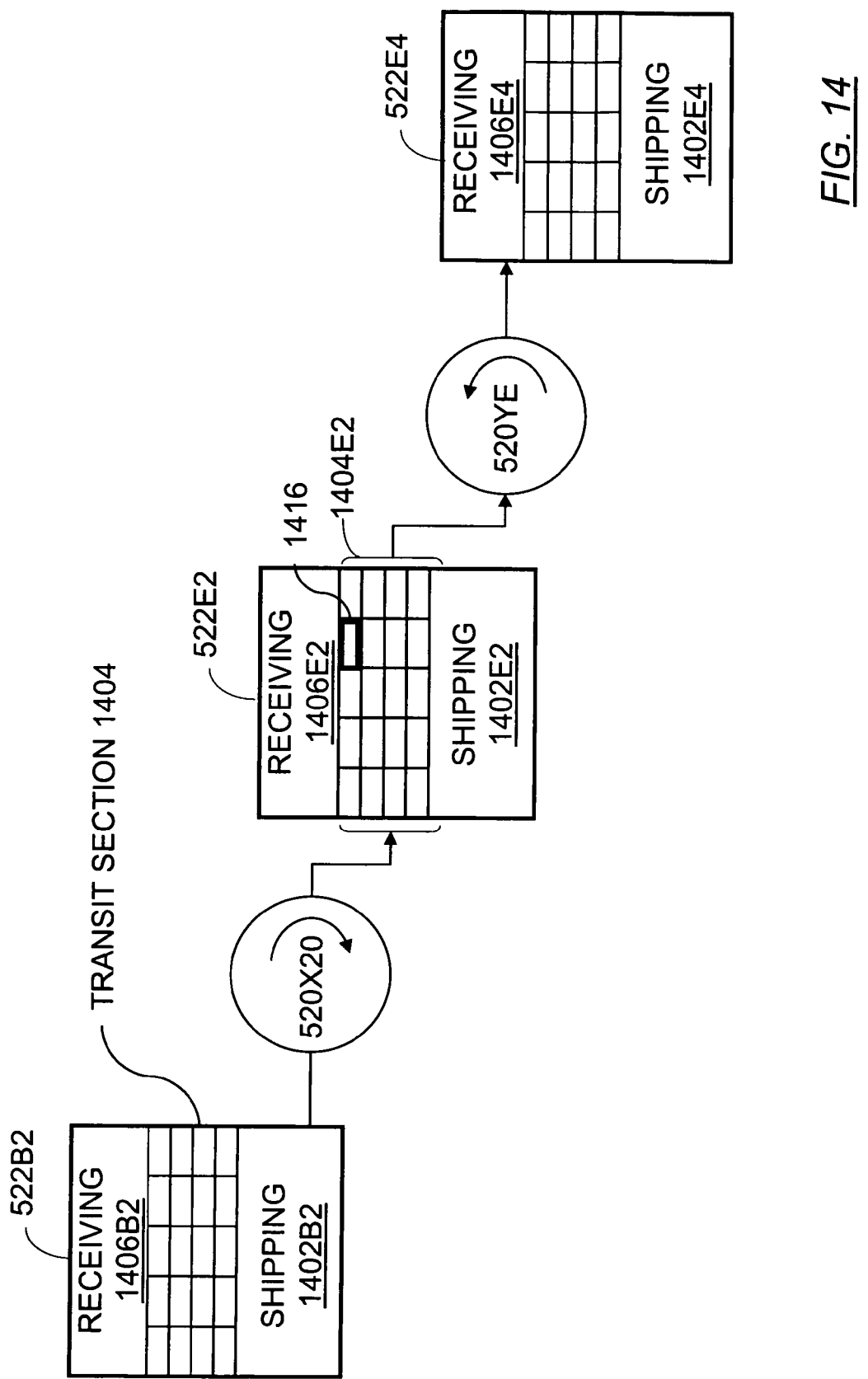
FIG. 14 illustrates a connection traversing two rotators, hence two paths, in the two-dimensional circulating switch of FIG. 5 where each switch module includes a shared memory of the type illustrated in FIG. 11 and the two paths are temporally coupled, in accordance with an embodiment of the present invention.

FIG. 14 illustrates a route from source switch module 522B2 to destination switch module 522E4 traversing an intermediate switch module 522E2 and two rotators 520X2 and 520YE in a two-dimensional circulating switch 500. Unlike the example of FIG. 12, each switch module 522 is organized into three sections, as illustrated in FIG. 11, including a shipping section 1402, a transit section 1404, and a receiving section 1406, with corresponding indices B2, E2, and E4 and each transit section 1404 is divided into sections 1416. The paths between successive switch modules 522 are temporally coupled, thus requiring a first-order vacancy-matching process. A data segment in transit at an intermediate switch module 522E2 is held in a corresponding sub-section 1416 in the transit section 1404E2. When a sub-section 1416 is reserved, a subsequent data segment of the same data stream (directed to destination switch module 522E4) may wait at its source switch module. Thus, successive data segments of the same data stream experience the same systematic transit delay which is determined solely by the route selected and is independent of traffic conditions.

Figure 15:
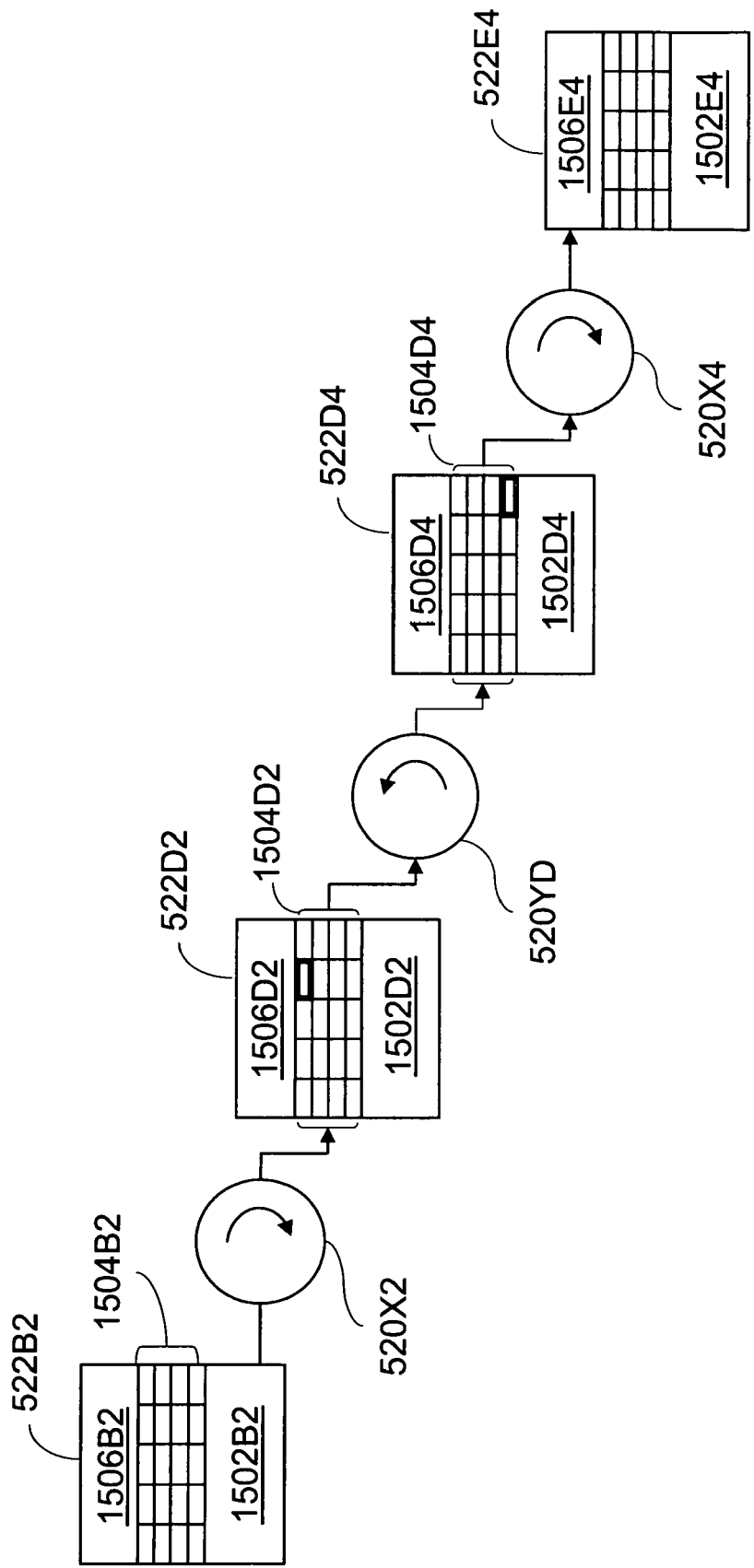
FIG. 15 illustrates a connection traversing three rotators, hence three paths, in the two-dimensional circulating switch of FIG. 5 where each switch module includes a shared memory of the type illustrated in FIG. 11 and the paths are temporally coupled, in accordance with an embodiment of the present invention.

FIG. 15 illustrates a route from a source switch module 522B2 to a destination switch module 522E4 traversing two intermediate switch modules, 522D2, 522D4 and three rotators 520X2, 520YD, and 520X4, in a two-dimensional circulating switch 500 (FIG. 5), where each switch module is of the type illustrated in FIG. 11. Each switch module 522 is organized into three sections including a shipping section 1502, a transit section 1504, and a receiving section 1506, with corresponding indices B2, D2, D4, and E4 and each transit section 1504 is divided into sections each for holding at least one data segment. The traversed paths are temporally coupled. A data segment transmitted along the route is read from the shipping section 1502B2 of switch module 522B2, written in a transit section in switch module 522D2, then in a transit section in switch module 522D4, then in the receiving section 1506E4 of destination switch module 522E4. A data segment written in a transit section of a switch module is read within a rotation cycle and, hence, the two paths traversing rotators 520X2 and 520YD are temporally coupled.

A reference phase of a rotator may be defined by the output port to which input port 0 is connected at the start of a rotation cycle. The rotators 520 in the two-dimensional circulating switch 500 may have different rotation reference phases. However, hereinafter, all clockwise rotators 520Xj, j=0, 1, 2, 3, and 4, are considered to have the same reference phase, i.e., they all rotate in step connecting likewise numbered inlets to likewise numbered outlets during a given rotation phase of the rotation cycle. Similarly, all counterclockwise rotators 520Yj, j=0, 1, 2, 3, and 4, have the same reference phase, all clockwise rotators 520XA, 520XB, 520XC, 520XD, and 520XE rotate in step and all counterclockwise rotators 520YA, 520YB, 520YC, 520YD, and 520YE rotate in step. With identical switch modules 522, all primary one-dimensional circulating switches 532 are identical and all "secondary" one-dimensional circulating switches 534 are identical. Thus, it suffices to use only four spatial-temporal patterns for the entire two-dimensional switch 500. It is noted that the number of spatial-temporal patterns depends on the number of rotators per rotor. For example, if all rotors are identical and each rotor uses four rotators where any two rotators have either different rotation directions or different reference phases, the number of rotation patterns would be sixteen.

FIG. 16 illustrates four connectivity tables 1610, 1611, 1620, and 1621 used in defining paths between switch modules in the two-dimensional circulating switch 500 of FIG. 5 which uses two rotators of opposite rotation direction for each one-dimensional circulating switch 532 or 534. Each connectivity table indicates a switch module to which each switch module 522 connects through a selected rotator 520 during a particular rotation phase. A cyclic-time row 1612 indicates a cyclic time, t, 0≦t<4, over three rotation cycles and an absolute time row 1614 indicates an absolute time, T. A first source switch module-identity column 1630 references five switch modules (522Aj, 522Bj, 522Cj, 522Dj, 522Ej) as Aj to Ej associated with rotators 520Xj and 520Yj (that is, belonging to one-dimensional primary circulating switch 532-*j*), where j=0, 1, 2, 3, or 4. Likewise, a second source switch module-identity column 1640 references five switch modules (522k0, 522k1, 522k2, 522k3, 522k4) as k0 to k4 for rotator 520Xk and 520Yk (that is, belonging to one-dimensional secondary circulating switch 534-*k*), where k is any of indices {A, B, C, D, E}.

The four connectivity tables 1610, 1611, 1620, 1621, respectively indicate the connectivity of each switch-module pair within: a primary one-dimension circulating switch 532 through a clockwise rotator; a primary one-dimension circulating switch 532 through a counterclockwise rotator; a secondary one-dimension circulating switch 534 through a clockwise rotator; and a secondary one-dimension circulating switch 534 through a counterclockwise rotator.

A source switch module 522 belonging to primary one-dimensional circulating switch 532-*j* and listed in the module-identity column 1630 connects to destination switch modules, in one-dimensional circulating switch 532-*j*, identified in the first connectivity table 1610 during successive rotation phases through rotator 520Xj, and to destination switch modules, in one-dimensional circulating switch 532*j*, identified in the second connectivity table 1611 during successive rotation phases through rotator 520Yj, where the index j, 0≦j<4, identifies a primary one-dimensional circulating switch 532.

A source switch module 522 belonging to secondary one-dimensional circulating switch 534-*k* and listed in the module-identity column 1640 connects to destination switch modules, in one-dimensional circulating switch 534-*k*, identified in the third connectivity table 1620 during successive rotation phases through rotator 520Xk, and to destination switch modules, in one-dimensional circulating switch 534-*k*, identified in the fourth connectivity table 1621 during successive rotation phases through rotator 520Yk, where the index k denotes any of the indices {A, B, C, D, E} identifying the secondary one-dimensional circulating switches in FIG. 5.

Figure 17:
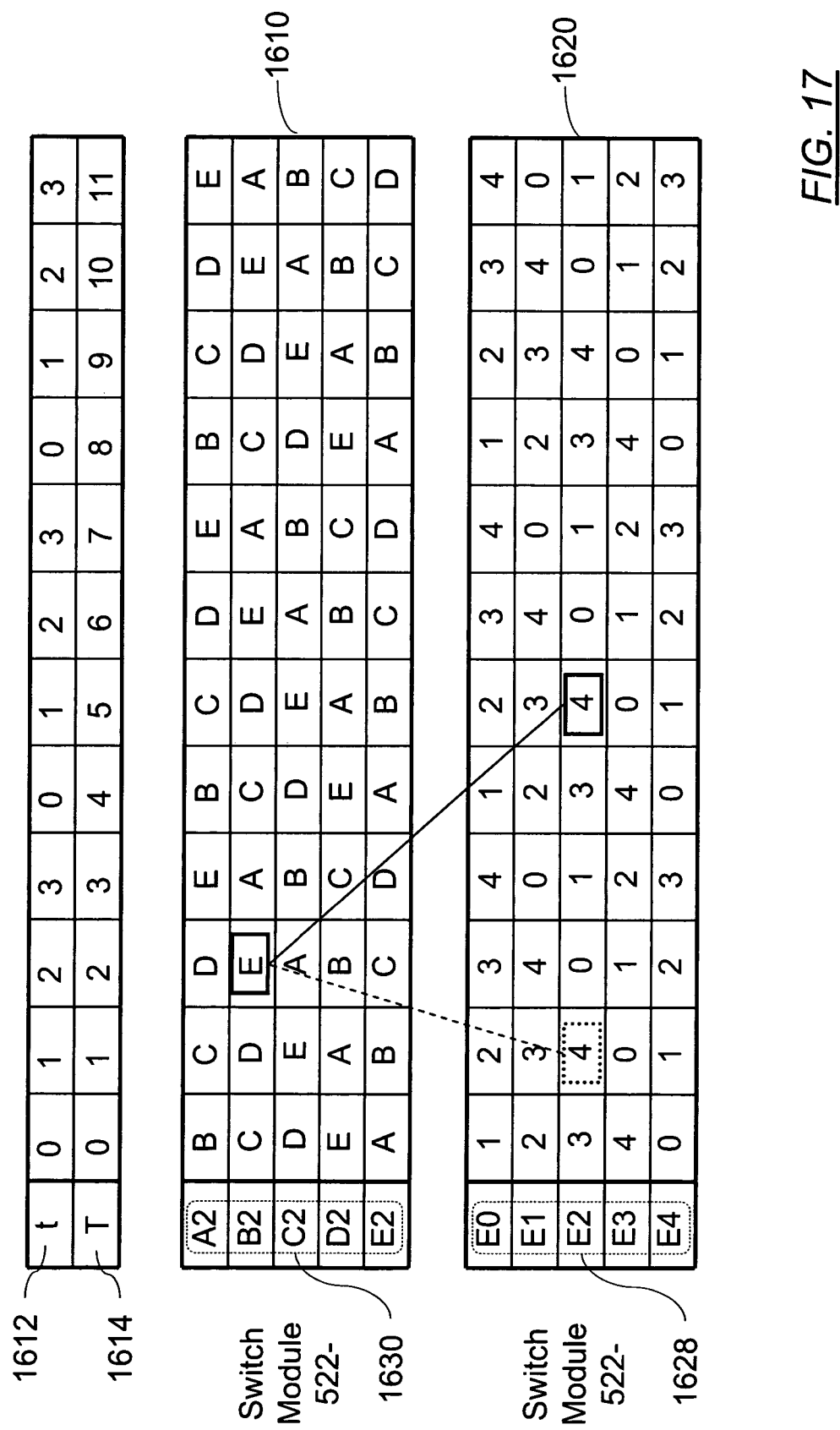
FIG. 17 illustrates exemplary connectivity tables for two rotators in the two-dimensional circulating switch of FIG. 5.

Consider that it is desired to transfer data segments from source switch module 522B2 to destination switch module 522E4 through a path traversing clockwise rotator 520X2 then clockwise rotator 520XE for the two-dimensional circulating switch 500 of FIG. 5. FIG. 17 illustrates the use of the first connectivity table 1610 and the third connectivity table 1620. Tables 1610 and 1620 are used when rotators 520X2 and 520XE are selected to connect a switch module 522A2, 522B2, 522C2, or 522D2 of primary one dimensional circulating switch 532-2 to any of switch modules 522E0, 522E1, 522E3, or 522E4 of secondary one dimensional circulating switch 534-E. A route from source switch module 522B2 to destination switch module 522E4 through intermediate switch module 522E2 is illustrated.

In such a case, the first connectivity table 1610 may be used to determine that source switch module 522B2 connects to intermediate switch module 522E2 through rotator 520X2 during rotation phase t=2 (T=2) and the third connectivity table 1620 may be used to determine that intermediate switch module 522E2 connects to destination switch module 522E4 through rotator 520XE during rotation phase t=1 (T=1, 5, 9, 13, etc.). A systematic transit delay along the indirect route has a value of three rotation phases (5−2). FIG. 17 also illustrates a reverse route from switch module 522E4 to switch module 522B2 with a systematic transit delay of one rotation phase. The sum of the systematic transit delays of the forward and reverse routes equals the duration of the rotation cycle (four rotation phases).

Figure 18:
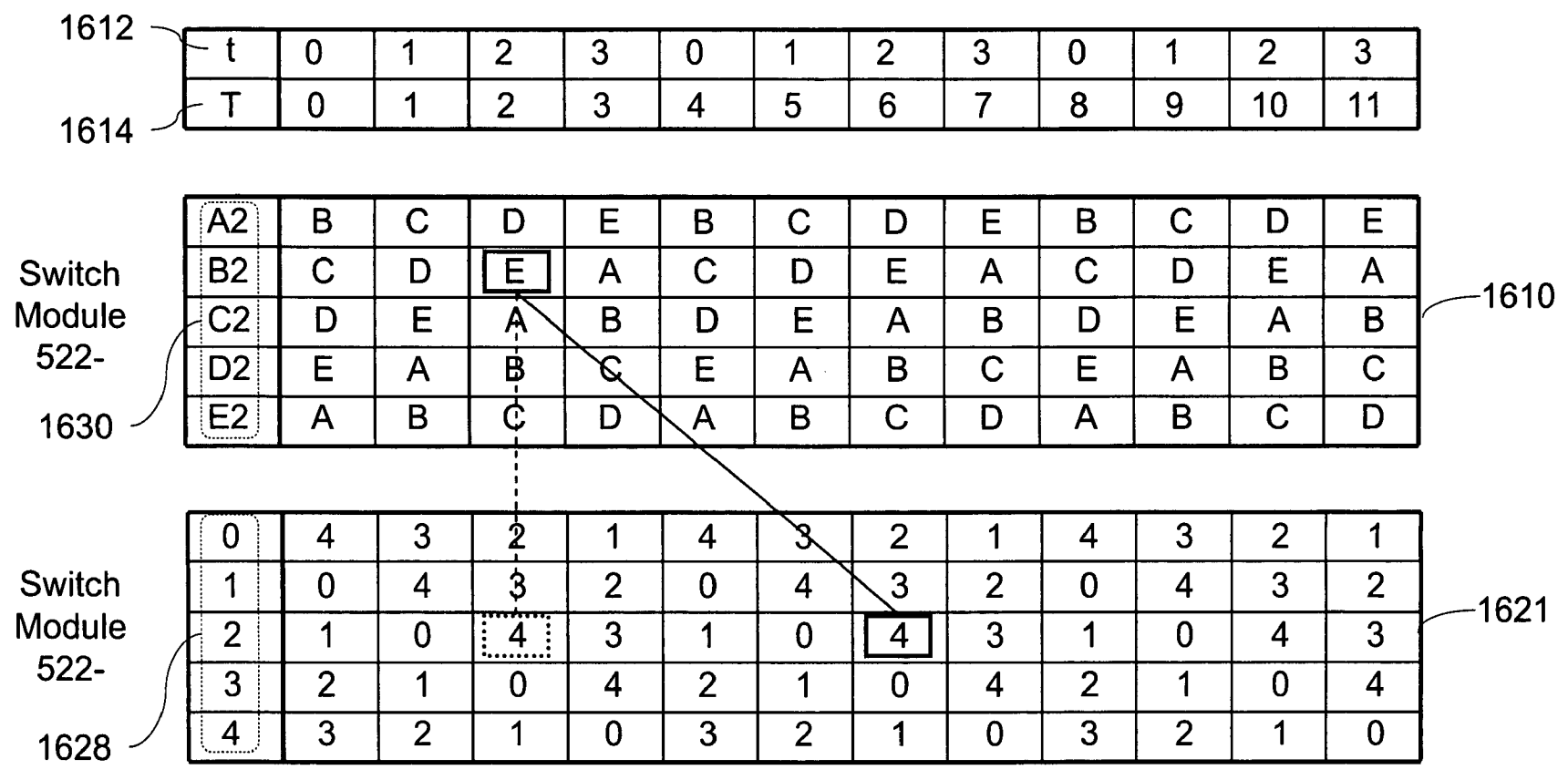

Transfer of data segments from source switch module 522B2 to destination switch module 522E4 through a path traversing clockwise rotator 520X2 then counterclockwise rotator 520YE is illustrated in FIG. 18 using the first connectivity table 1610 and the fourth connectivity table 1621. Tables 1610 and 1621 are used when rotators 520X2 and 520YE are selected to connect a switch module 522A2, 522B2, 522C2, or 522D2 of primary circulating switch 532-2 to any of switch modules 522E0, 522E1, 522E3, or 522E4 of secondary circulating switch 534E. A route from source switch module 522B2 to destination switch module 522E4 through intermediate switch module 522E2 is illustrated.

In such a case, the first connectivity table 1610 may be used to determine that source switch module 522B2 connects to intermediate switch module 522E2 through rotator 520X2 during rotation phase t=2 (T=2) and the fourth connectivity table 1621 may be used to determine that intermediate switch module 522E2 connects to destination switch module 522E4 through rotator 520YE during rotation phase t=2 (T=2, 6, 10, 14, etc.). A systematic transit delay along the indirect route has a value of four rotation phases (6−2). FIG. 18 also illustrates a reverse route from switch module 522E4 to switch module 522B2 where switching occurs within the same rotation phase (the systematic transit delays illustrated are based on a discipline of writing then reading within a rotation phase). The sum of the systematic transit delays of the forward and reverse routes equals the duration of the rotation cycle (four rotation phases).

Figure 19:
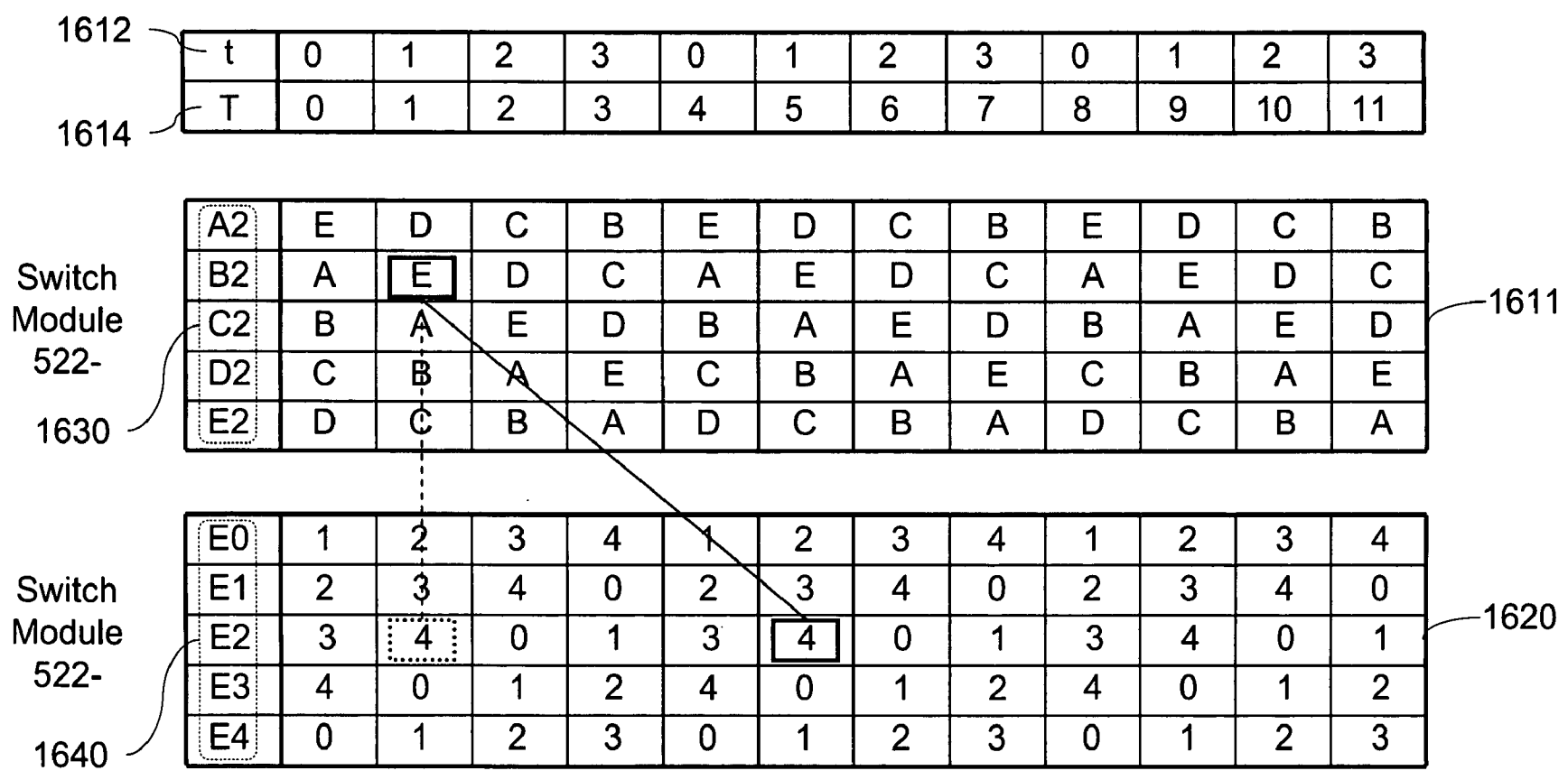

FIG. 19 illustrates transfer data segments from source switch module 522B2 to destination switch module 522E4 through a path traversing counterclockwise rotator 520Y2 then clockwise rotator 520XE where the systematic transit delay equals 4 rotation phases. FIG. 19 also illustrates a reverse route from switch module 522E4 to switch module 522B2 with systematic transit delays similar to those of FIG. 18.

Figure 20:
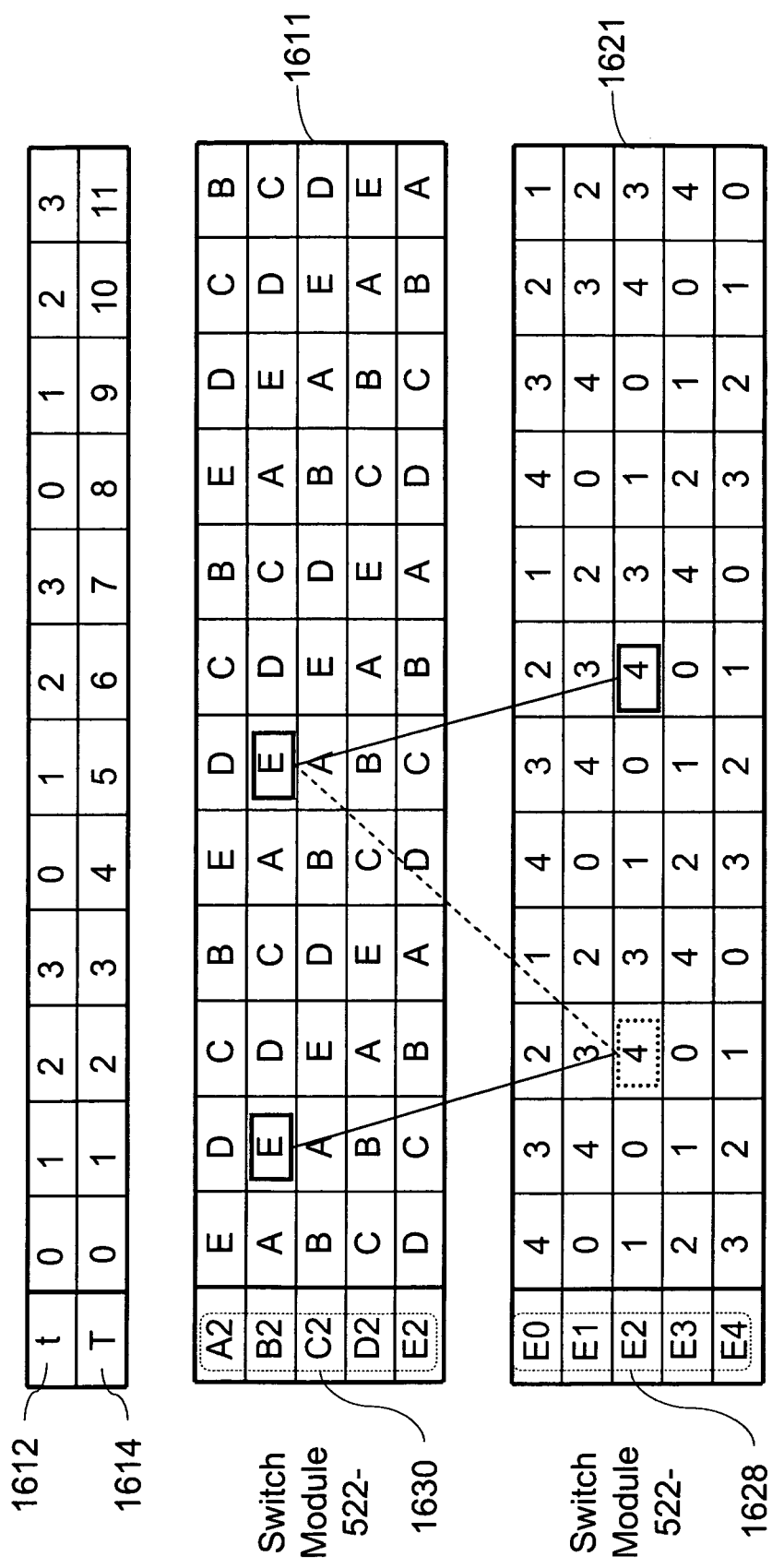
FIG. 20 illustrates still further exemplary connectivity tables for two rotators in the two-dimensional circulating switch of FIG. 5.

FIG. 20 illustrates transfer data segments from source switch module 522B2 to destination switch module 522E4 through a path traversing counterclockwise rotator 520Y2 then counterclockwise rotator 520YE where the systematic transit delay equals one rotation phase. FIG. 20 also illustrates a reverse route from switch module 522E4 to switch module 522B2 with a systematic transit delay of three rotation phases.

There are eight intersecting first-order routes from source switch module 522B2 to destination switch module 522E4 that employ one intermediate switch module each, and each of the routes has an associated switching delay:

522B2-520X2-522E2-520XE-522E4;
522B2-520X2-522E2-520YE-522E4;
522B2-520Y2-522E2-520XE-522E4,
522B2-520Y2-522E2-520YE-522E4;
522B2-520XB-522B4-520X4-522E4;
522B2-520XB-522B4-520Y4-522E4;
522B2-520YB-522B4-520X4-522E4; and
522B2-520YB-522B4-520Y4-522E4.

There are also eight intersecting first-order routes from source switch module 522B2 to each of the other 15 switch modules that do not have a one-dimensional circulating switch (either primary or secondary) in common with source switch module 522B2. That is, there are 128 routes from source switch module 522B2 that use one intermediate switch module each to reach a destination switch module. As there are 25 potential source switch modules, 3200 routes that use one intermediate switch module each to reach a destination switch module may be generated for the two-dimensional circulating switch 500 of FIG. 5. Each of the routes is characterized by a corresponding systematic transit delay. A route that uses one intermediate switch module requires a first-order vacancy-matching process and is referenced as a first-order route.

The first-order routes from a source switch module to a sink switch module may be sorted according to the systematic transit delay to facilitate route-selection.

Figure 21:
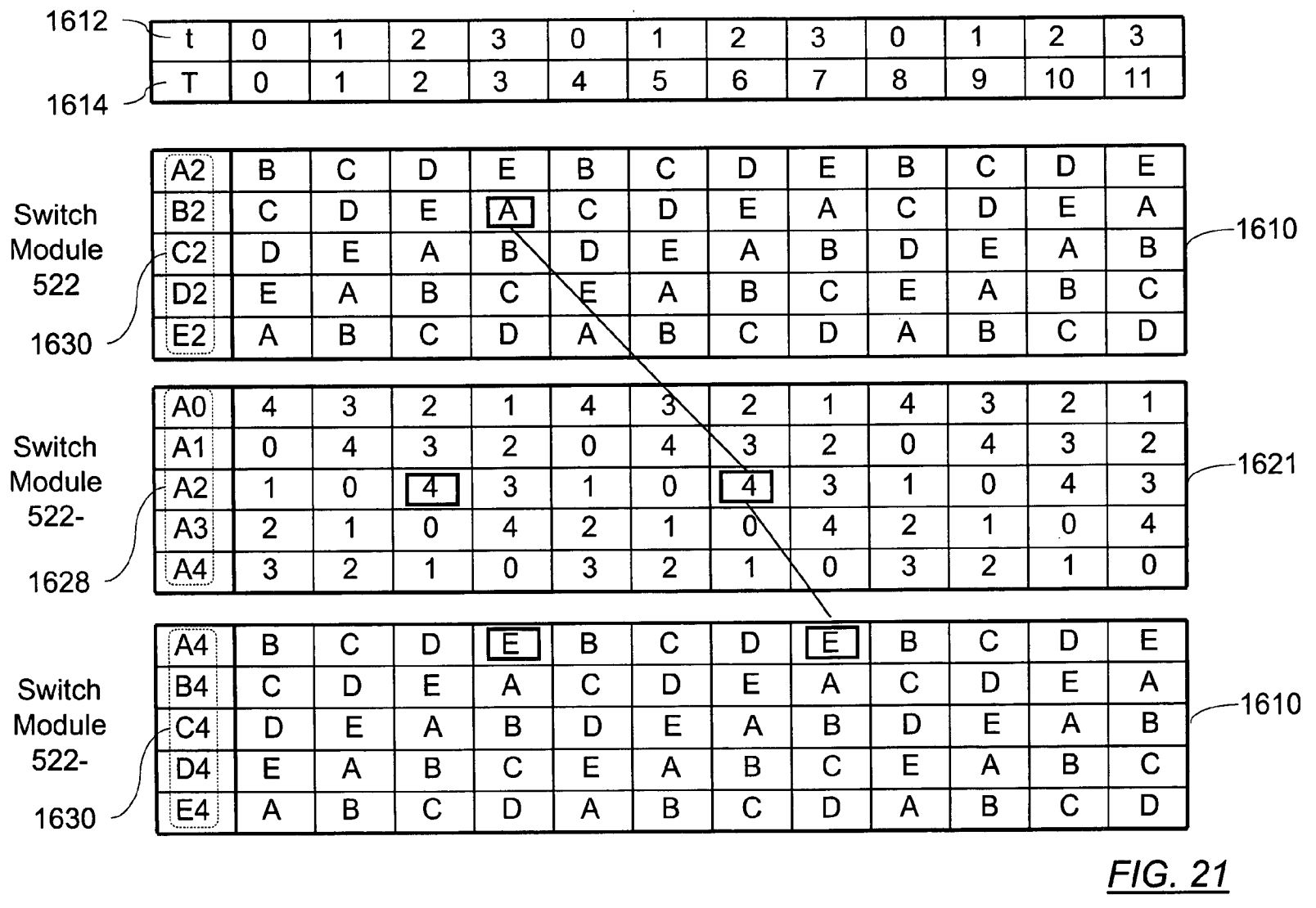

As discussed, there are 48 second-order routes, from each source switch module 522 to each other switch module 522 in the configuration of FIG. 5, each traversing two intermediate switch modules. FIG. 21 illustrates a route from source switch module 522B2 to destination switch module 522E4 traversing clockwise rotator 520X2, any of counterclockwise rotators 520Yj, where the index j is any of indices {A, B, C, D, and E}, then clockwise rotator 520X4. A first connectivity table 1610-1 (FIG. 16), a fourth connectivity table 1621, and a first connectivity table 1610-2 are used to determined the systematic transit delay associated with the route.

A source switch module listed in the first module-identity column 1630 connects to destination switch modules identified in connectivity table 1610-1 during successive rotation phases through the rotator 520X2. Using switch module 522A2 as the first intermediate switch module, a source switch module listed in the source switch module-identity column 1640 connects to switch modules identified in connectivity table 1621 during successive rotation phases through the rotator 520YA. The second intermediate switch module is now determined as 522A4 and a source switch module listed in the source switch module-identity column 1630 in table 1610-2 connects to destination switch modules identified in connectivity table 1610-2 during successive rotation phases through the rotator 520X4.

Consider that it is desired to transfer data segments from source switch module 522B2 to destination switch module 522E4 along the route traversing rotators 520X2, 520YA, and 520X4. In such a case, connectivity table 1610-1 may be used to determine that source switch module 522B2 connects to the first intermediate switch module 522A2 through rotator 520X2 during rotation phase t=3. Connectivity table 1621 may be used to determine that the first intermediate switch module 522A2 connects to the second intermediate switch module 522A4 through rotator 520YA during rotation phase t=2 (T=2, 6, 10, 14, etc.). Connectivity table 1610-2 may be used to determine that the second intermediate switch module 522A4 connects to the destination switch module 522E4 through rotator 520X4 during rotation phase t=3 (T=3, 7, 11, 15, etc.). The transfer of any data segment from source switch module 522B2 to destination switch module 522E4 along the route takes place at T=3 from source switch module 522B2 to intermediate switch module 522A2, at T=6 from intermediate switch module 522A2 to intermediate switch module 522A4, and at T=7 from intermediate switch module 522A4 to destination switch module 522E4, resulting in a systematic transit delay of four rotation phases (7–3).

FIG. 22 illustrates another second-order route from source switch module 522B2 to destination switch module 522E4 traversing counterclockwise rotator 520YB, any of clockwise rotators 520Xj, and counterclockwise rotator 520YE, where the index j is any of indices 0 to 4. A connectivity table 1621-1 (FIG. 16), a connectivity table 1610, and a connectivity table 1621-2 may be used to determine the systematic transit delay of the route. Using switch module 522B0 as the first intermediate switch module, a source switch module listed in the source switch module-identity column 1640 connects to switch modules identified in the connectivity matrix 1621 during successive rotation phases through the rotator 520YB. The second intermediate switch module is now determined as 522E0 and a source switch module listed in the source switch module-identity column 1640 in connectivity table 1621-2 connects to destination switch modules identified in the connectivity table 1621-2 during successive rotation phases through the rotator 520YE. The systematic transit delay along this route is illustrated to equal three rotation phases as indicated in FIG. 22.

The switching delay along seven additional indirect routes that use the same two intermediate switch modules each between source switch module 522B2 and destination switch module 522E4 may be determined. Additionally, there exist 40 more routes that use two intermediate switch modules between source switch module 522B2 and destination switch module 522E4, each characterized by a systematic transit delay.

Likewise, there are also 48 routes from source switch module 522B2 to each of the other 15 switch modules that do not have a one-dimensional circulating switch (either primary or secondary) in common with source switch module 522B2. That is, there are 768 routes from source switch module 522B2 that use two intermediate switch modules each to reach a destination switch module. As there are 25 potential source switch modules, there are 19200 routes that use two intermediate switch modules each to reach a destination switch module for the two-dimensional circulating switch 500 of FIG. 5. Each of the routes has a corresponding systematic transit delay.

As was the case with first-order routes that use a single intermediate switch module each to reach a destination switch module, the second-order routes in each second-order route set from a source switch module to a destination switch module may be sorted according to the systematic transit delay in order to facilitate route selection and scheduling.

FIG. 24 illustrates exemplary rotator connectivity matrices 2410-1 and 2410-2 for a clockwise rotator 520Xv and a counterclockwise rotator 520Yv, respectively, where $0 \leq v < 4$ for a rotator (clockwise or counterclockwise) associated with a primary one-dimensional circulating switch 532-v and v is any of indices {A,B,C,D,E} for a rotator (clockwise or counterclockwise) associated with a secondary one-dimensional circulating switch 534-v. An entry 2412 in connectivity matrix 2410-1 contains an identifier of a rotation phase, of a rotation cycle, during which a corresponding source switch module 522Av, 522Bv, 522Cv, 522Dv, or 522Ev is connected to a destination switch module 522Av, 522Bv, 522Cv, 522Dv, or 522Ev through a clockwise rotator 520Xv. The rotation cycle in the configuration of FIG. 5 has four rotation phases labeled 0, 1, 2, and 3. Likewise, an entry 2410-2 contains an identifier of a rotation phase, within the rotation cycle, during which a corresponding source switch module connects to a corresponding destination switch module through a counterclockwise rotator 520Yv. An entry 2412 or 2422 marked "x" corresponds to a non-existent path; a switch module does not connect to itself through any rotator.

If all clockwise rotators have the same reference phase and all counterclockwise rotators have the same reference phase, then only the two connectivity matrices 2410-1 and 2410-2 would be needed. The clockwise rotators or counterclockwise rotators may, however, be phase-shifted thus requiring additional connectivity matrices 2410.

Figure 23:
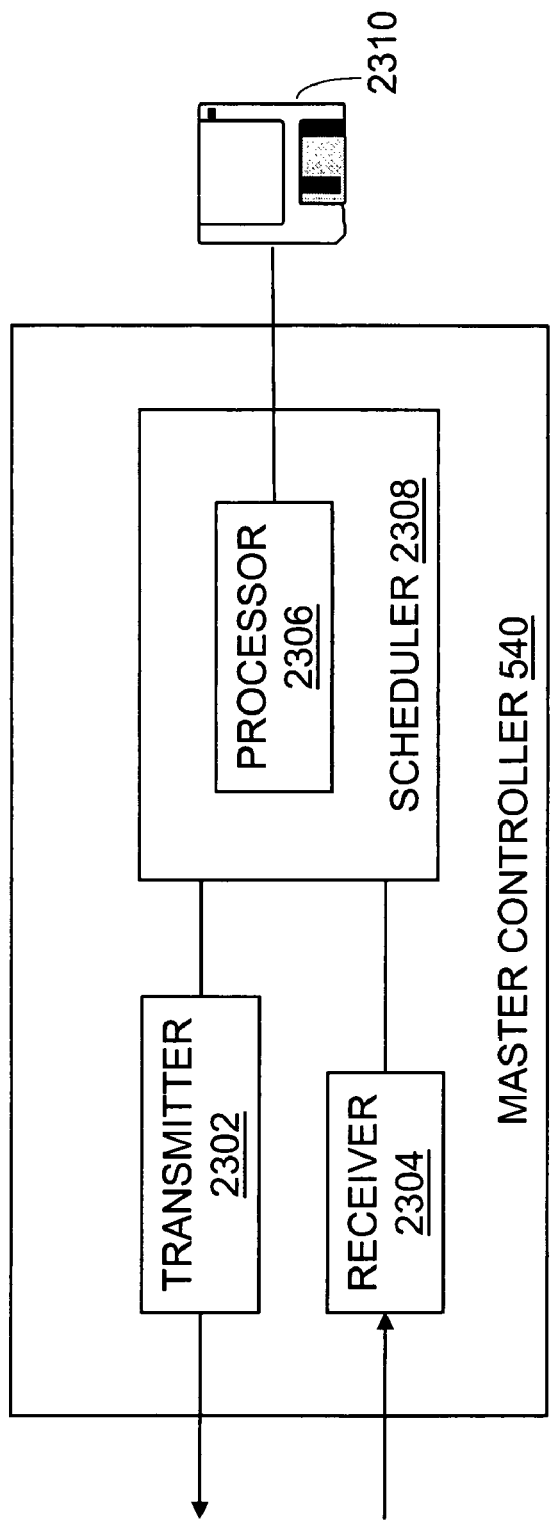
FIG. 23 illustrates an exemplary master controller for the two-dimensional circulating switch of FIG. 5.

The master controller 540 is provided with a scheduler 2308, as illustrated in FIG. 23. The scheduler 2308 includes a processor 2306 that may be loaded with computer executable instructions for executing methods exemplary of the present invention from a computer readable medium 2310, which could be a disk, a tape, a chip or a random access memory containing a file downloaded from a remote source. The scheduler 2308 connects to a transmitter 2302 and a receiver 2304 for sending and receiving from switch module 522E4. The master controller 540 may store in a memory (not shown) a connectivity pattern of each rotator of each rotor 520.

In operation, the source switch module 522B2 receives data streams from subtending data traffic sources and organizes the received data streams into data segments. The destination switch module 522E4 may be determined based on a data traffic sink identifier associated with one or more of the data segments formed from the received data streams.

The source switch module 522B2 transmits to the master controller 540 an indication of a requirement to transfer data segments to the destination switch module 522E4, the indication may be called a "connection request" specifying switch module 522B2 as a source switch module and switch module 522E4 as a destination switch module. At the master controller 540, the scheduler 2308 receives the connection request and consults a table containing a route set of routes requiring first-order vacancy-matching to select a route from the source switch module 522B2 to the destination switch module 522E4. The scheduler 2308 may first, for instance, consult the route set of routes having the least systematic transit delay.

Having selected a candidate route, for example, 522B2-520X2-522E2-520XE-522E4, from the consulted route set, the scheduler 2308 may then determine whether the path between source switch module 522B2 and intermediate switch module 522E2 traversing rotator 520X2 is available. Subsequently, the scheduler 2308 may determine whether the path between intermediate switch module 522E2 and destination switch module 522E4 traversing rotator 520XE is available. Such a determination may be made by consulting availability matrices 2510 (to be described below) of paths traversing each of the rotators 520X2, 520XE.

The process of determining availability of paths traversing rotators 520X2, 520XE in the rotation phases that correspond to the rotation phases required by the candidate route is termed "first-order temporal matching" or "first-order vacancy matching".

Where either one of the paths traversing rotators 520X2, 520XE is unavailable, the scheduler 2308 may consult the route set of routes requiring first-order matching to select another candidate route. Having selected another candidate route, for example, 522B2-520XB-522B4-520Y4-522E4, from the consulted route set, the scheduler 2308 may then determine the availability of the paths traversing rotators 520XB, 520Y4.

Where either one of the paths traversing rotators 520XB, 520Y4 is unavailable, the scheduler 2308 may consult a route set of routes requiring second-order matching to select a second-order route from the source switch module 522B2 to the destination switch module 522E4. The scheduler 2308 may select the second-order route of least systematic transit delay.

Having selected 522B2-520X2-522A2-520YA-522A4-520X4-522E4 from the consulted route set as the candidate route, the scheduler 2308 may then determine the availability of paths traversing rotators 520X2, 520XA, 520X4. The process of determining availability of paths traversing rotators 520X2, 520XA, 520X4 may be termed "second-order temporal matching" or "second-order vacancy matching".

Where all three paths traversing rotators 520X2, 520YA, 520X4 are available, the scheduler 2308 may: instruct the source switch module 522B2 to transmit the data segments associated with a data sink connected to the destination switch module 522E4 through rotator 522X2 to intermediate switch module 522A2; instruct the first intermediate switch module 522A2 to transmit data segments received from the source switch module 522B2 through rotator 520YA to the second intermediate switch module 522A4; and instruct the second intermediate switch module 522A4 to transmit data segments received from the first intermediate switch module 522A2 through rotator 520X4 to destination switch module 522E4.

Additionally, the scheduler 2308 may mark each of the availability matrices associated with the rotators 520X2, 520YA, 520X4 so that the planned usage of the rotators 520X2, 520YA, and rotator 520X4 is recorded.

Figure 25:
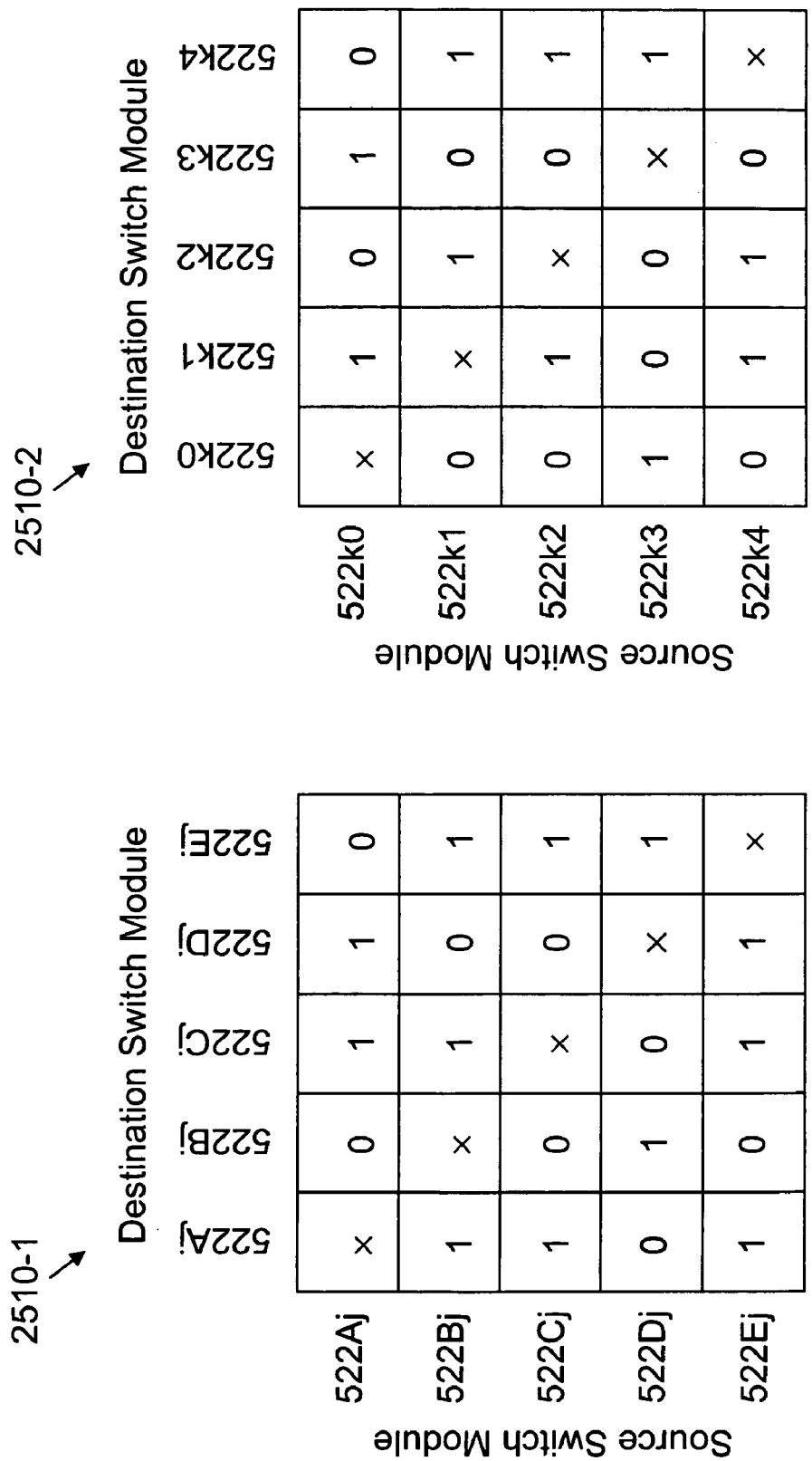
FIG. 25 illustrates an exemplary availability matrix for a rotator in the two-dimensional circulating switch of FIG. 5.

Exemplary availability matrix 2510-1 for inter-switch-module paths traversing a rotator 520Xj, or 520Yj, $0 \leq j < 4$, associated with a primary one-dimensional circulating switch, is illustrated in FIG. 25. The availability matrix 2510-1 provides an indication of availability ("0") and non-availability ("1") for paths traversing rotator 520X2 for example. Exemplary availability matrix 2510-2 for inter-switch-module paths traversing rotator 520Xk or 520Yk, where k is any of indices $\{A, B, C, D, E\}$ is illustrated in FIG. 25. The availability matrix 2510-2 provides an indication of availability ("0") and non-availability ("1") for paths traversing rotator 520XB, for example. An availability matrix 2510 is needed for each rotator 520 in the two-dimensional circulating switch 500 of FIG. 5.

In an embodiment of an aspect of the present invention, to successfully find a first-order vacancy match, the scheduler 2308 finds a "0" in the entry corresponding to the desired source switch module and the desired intermediate switch module in the matrix 2510 corresponding to the first desired rotator and also finds a "0" in the entry corresponding to the desired intermediate switch module and the desired destination switch module in the availability matrix 2510 corresponding to the second desired rotator.

In an embodiment of an aspect of the present invention, to successfully find a second-order vacancy match, the scheduler 2308 finds a "0" in the entry corresponding to the desired source switch module and the desired first intermediate switch module in the availability matrix 2510 corresponding to the first desired rotator, finds a "0" in the entry corresponding to the desired first intermediate switch module and the desired second intermediate switch module in the availability matrix 2510 corresponding to the second desired rotator and also finds a "0" in the entry corresponding to the desired second intermediate switch module and the desired destination switch module in the availability matrix 2510 corresponding to the third desired rotator.

Fine Granularity

Each rotation phase may be divided into an integer number of time slots each time slot having a sufficient duration to accommodate a data segment. Thus, during a rotation phase, multiple data segments which may have different destination switch modules may be transferred from a switch module to another.

It may be desirable to use a scheduling cycle that covers an integer number of rotation cycles. As such, a scheduling time frame may be defined with a duration equivalent to an integer multiple of the time taken for one rotation cycle.

Figure 26:
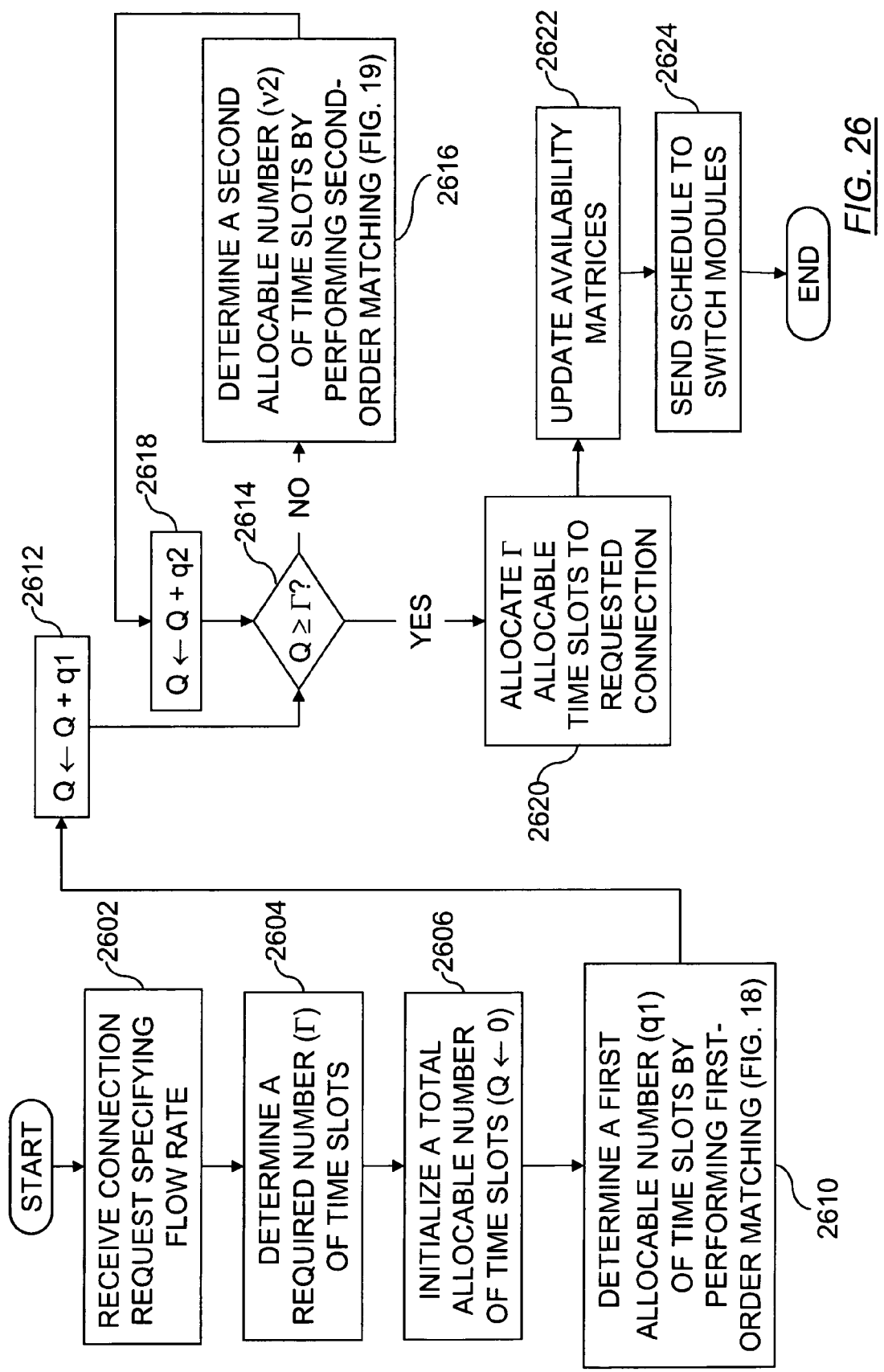
FIG. 26 illustrates steps in an exemplary method of scheduling a connection of a specified flow rate in a two-dimensional circulating switch of the type illustrated in FIG. 5, according to an embodiment of the present invention.

The scheduling time frame may be used in a method of scheduling a connection of a specified flow rate in a two-dimensional circulating switch, steps of which are illustrated in FIG. 26. FIG. 26 illustrates a route-selection and scheduling process for a connection from a source switch module 522 to a destination switch module 522 where the source and destination switch modules belong to different primary circulating switches 532 and different secondary circulating switches 534. When the source switch module and the destination switch module belong to a common one-dimensional circulating switch (primary or secondary), the connection is preferably established within the common one-dimensional circulating switch according to a process described in the aforementioned U.S. patent application Ser. No. 10/780,557.

In particular, the scheduler 2308 may receive a connection request (step 2602) from a switch module, where the connection request specifies a source switch module, a destination switch module and a requested flow rate. A flow-rate unit may be defined as the size of one data segment divided by the period of a rotation cycle. Recall that a rotation cycle includes a number of rotation phases equal to the number of switch modules minus one, and a rotation phase may include multiple time slots. By dividing the requested flow rate by the flow-rate unit, the scheduler 2308 may determine (step 2604) a required number of time slots ($\Gamma$) in a scheduling time frame necessary to accommodate the connection request.

The scheduler 2308, as a first step in determining a total number of allocable time slots (Q), may initialize Q to zero (step 2606). The scheduler 2308 may then determine a first allocable number ($q1$) of time slots by performing first-order vacancy matching (step 2610). First-order vacancy matching is expanded upon in FIG. 27. The scheduler 2308 may then add the first allocable number of time slots to the total number of allocable time slots (step 2612).

The total number of allocable time slots may then be compared (step 2614), by the scheduler 2308, to the required number of time slots. Where the required number of time slots exceeds the total number of allocable time slots, the scheduler 2308 may determine a second allocable number ($q2$) of time slots by performing second-order vacancy matching (step 2616). Second-order vacancy matching is expanded upon in FIG. 28. The scheduler 2308 may then add the second allocable number of time slots to the total number of allocable time slots (step 2618).

The total number of allocable time slots may again be compared (step 2614), by the scheduler 2308, to the required number $\Gamma$ of time slots. Where the total number Q of allocable time slots reaches the required number $\Gamma$ of time slots, the scheduler 2308 may allocate the required number of allocable time slots to satisfy the connection request (step 2620). According to the allocation, the scheduler 2308 may update the availability matrices of each of the rotators affected by the allocation (step 2622) and send instructions to the affected source switch module and intermediate switch modules (step 2624), where the instructions indicate an identifier of a subsequent switch module. As described earlier, each switch module 522 has a module controller (not illustrated) which stores a rotator-connectivity matrix 2410 corresponding to each rotator 520 with which the switch module is associated. The instructions, perhaps combined with instructions related to satisfying other connection requests, may be considered to form a "schedule" of operation for each switch module 522.

In the configuration illustrated in FIG. 5, the scheduler 2308 may send a schedule to each of the affected source switch modules and intermediate switch modules (e.g., source switch module 522B2, first intermediate switch module 522A2 and second intermediate switch module 522A4) via the switch module 522E4 to which the master controller 540 is connected. From the perspective of the switch module 522E4 to which the master controller 540 is connected, the master controller 540 may appear to be a data source and the schedules may appear to be data segments with specific destinations (e.g., source switch module 522B2, first intermediate switch module 522A2 and second intermediate switch module 522A4).

Figure 27:
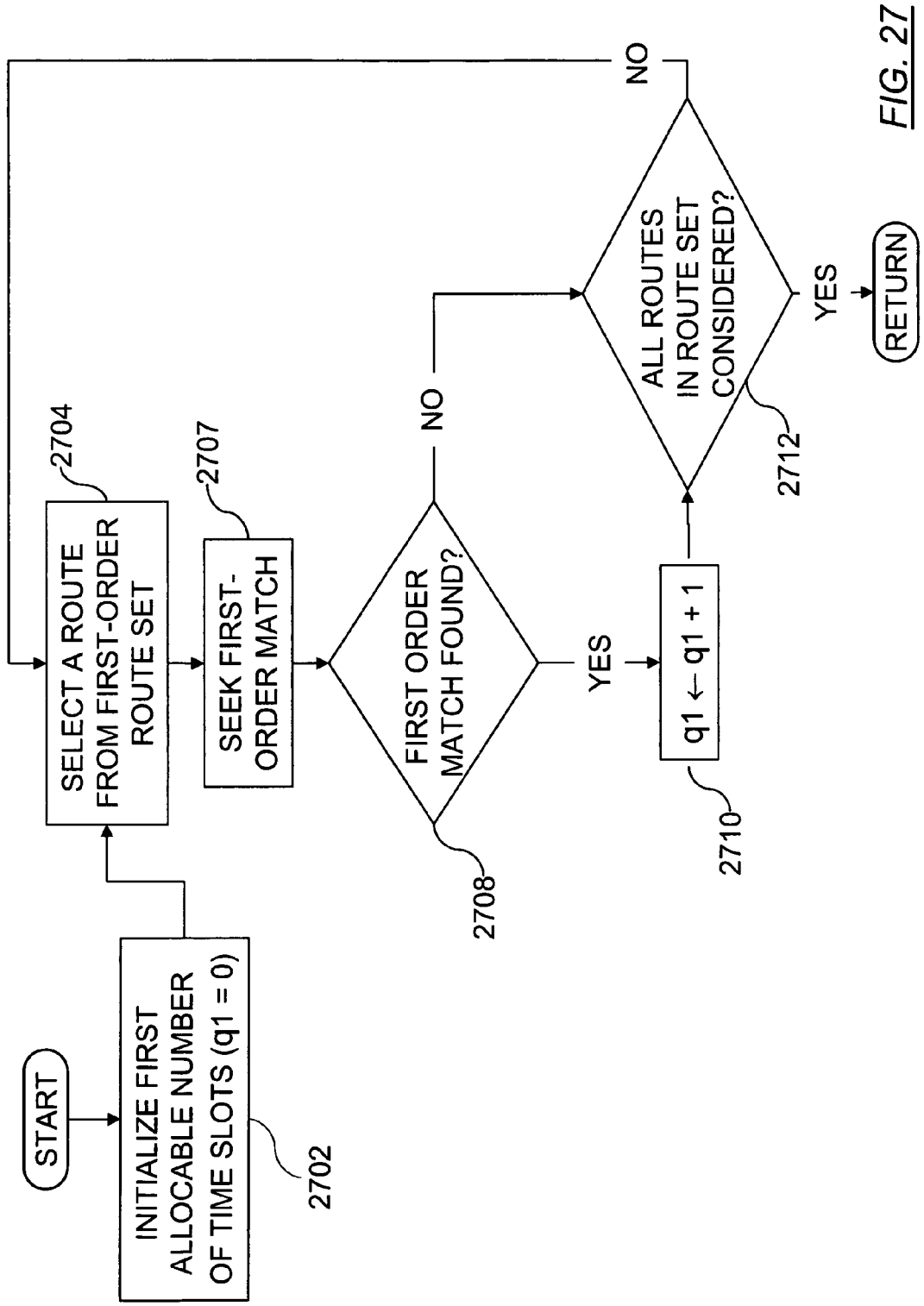
FIG. 27 illustrates steps in a first-order vacancy-matching process as part of the method of FIG. 26, according to an embodiment of the present invention.

FIG. 27 illustrates steps in a first-order vacancy matching process (step 2610). The scheduler 2308 begins the process by initializing the first number of allocable time slots (step 2702). The scheduler 2308 may then select a first-order route from the first-order route set (step 2704), perhaps according to a pre-determined policy based on the systematic transit delay value associated with each first-order route in the first-order route set. A first-order vacancy match is then sought (step 2707) by the scheduler 2308 for the first rotator and the second rotator specified in the selected route. Where it is determined (step 2708) that a first-order vacancy match has been found, the first number of allocable time slots is increased (step 2710) and it is determined (step 2712) whether all routes in the selected route set have been considered. Where it is determined (step 2708) that a first-order vacancy match has not been found, the determination (step 2712) of whether all routes in the selected route set have been considered is made without increasing the first number of allocable time slots.

Where it is determined that all routes in the first-order route set have been considered, the process is considered complete and the first number of allocable time slots is returned to the scheduling method of FIG. 26. However, where it is determined that all routes in the first-order route set have not been considered, another route is selected (step 2704) and a first-order vacancy match is once again sought (step 2707).

Figure 28:
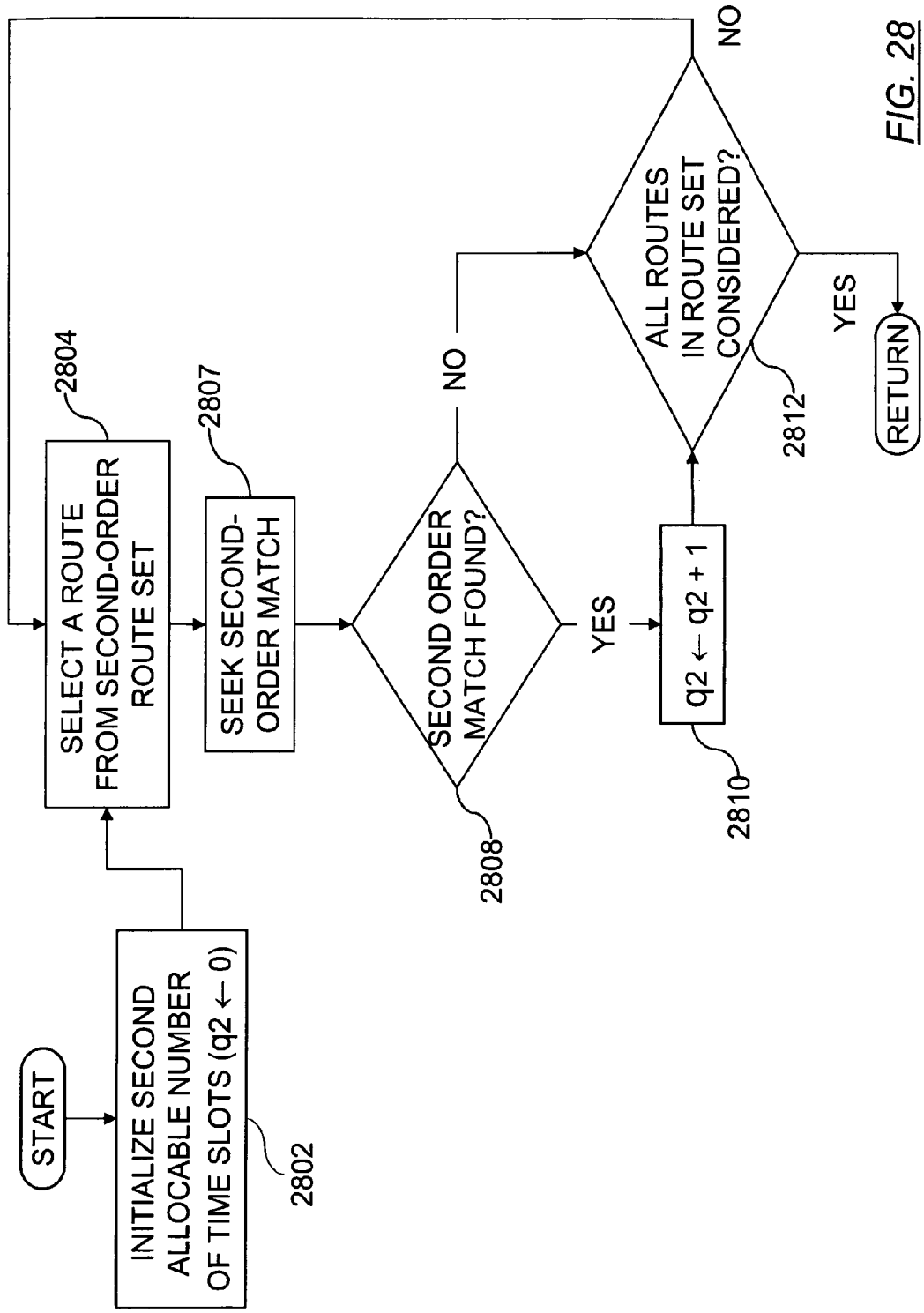
FIG. 28 illustrates steps in a second-order vacancy-matching process as part of the method of FIG. 26, according to an embodiment of the present invention.

FIG. 28 illustrates steps in a second-order vacancy matching process (step 2616). The scheduler 2308 begins the process by initializing the second number of allocable time slots (step 2802). The scheduler 2308 may then select a second-order route from the second-order route set (step 2804), perhaps according to a pre-determined policy based on the systematic transit delay value associated with each second-order route in the second-order route set. A second-order vacancy match is then sought (step 2807) by the scheduler 2308 for the first rotator, the second rotator and the third rotator specified in the selected route. Where it is determined (step 2808) that a second-order vacancy match has been found, the second number of allocable time slots is increased (step 2810) and it is determined (step 2812) whether all routes in the selected route set have been considered. Where it is determined (step 2808) that a second-order vacancy match has not been found, the determination (step 2812) of whether all routes in the second-order route set have been considered is made without increasing the second number of allocable time slots.

Where it is determined that all routes in the second-order route set have been considered, the process is considered complete and the second number of allocable time slots is returned to the scheduling process of FIG. 26. However, where it is determined that all routes in the selected route set have not been considered, another second-order route is selected from the second-order route set (step 2804) and a second-order vacancy match is once again sought (step 2807). If the total number of allocable time slots is greater than zero but less than the required number of time slots ($\Gamma$) per scheduling time frame, the scheduler 2308 may admit or reject the connection request according to a preset criterion.

Advantageously, the two-dimensional circulating switch 500 of FIG. 5 may be considered robust in that the two-dimensional circulating switch 500 may continue to function under partial component failure. For instance, where the route from source switch module 522B2 to destination switch module 522E4 over the route that includes path-set 801 and path-set 802 (FIG. 8) is in use by the source switch module 522B2 and the intermediate switch module 522E2 fails, an alternate first-order matching route may be available over path 803 and path 804. Additionally, as many as 48 alternate second-order matching routes may be available to connect the source switch module 522B2 to the destination switch module 522E4.

Further advantageously, the capacity of the two-dimensional circulating switch may be expanded without service interruption. Entire new one-dimensional circulating switches may be added to expand the capacity of a given two-dimensional circulating switch.

Still further, the two-dimensional circulating switch may be adapted to handle many different services, including those services characterized by packets, bursts, Time Division Multiplexed (TDM) frames, Synchronous Optical Network (SONET) frames, channels, etc. Such adaptation may be accomplished by appropriately configuring the switch modules 522.

It should be noted that a one-dimensional circulating switch may be defined by only a single rotator, but that the number of rotators defining a one-dimensional circulating switch is limited only by the capacity of each switch module as described in Applicant's U.S. patent application Ser. No. 10/780,557 referenced above.

The capacity of a two-dimensional circulating switch may be expanded to several Petabits per second. For example, using one-dimensional circulating switches each having 512 switch modules, and with each one dimensional circulating switch, primary or secondary, using four rotators of dimension 512×512 each, the total number of switch modules would be 262144. With switch module having 11 dual ports, including three access dual ports (a dual port includes an input port and an output port) interfacing with traffic sources and sinks, four inner dual ports interfacing with four rotators of a primary one-dimensional circulating switch, and four inner ports interfacing with four rotators of a secondary one-dimensional circulating switch, the total number of dual access ports would be 786432. With a port capacity of 10 Gb/s in each direction (10 Gb/s input and 10 Gb/s output), the total access capacity (the throughput) of the two-dimensional circulating switch would be 7.86 Petabits per second.

Other modifications will be apparent to those skilled in the art and, therefore, the invention is defined in the claims.

I claim:

1. A two-dimensional circulating switch comprising:
    a plurality of switch modules;
    a first plurality of rotators, each of said first plurality of rotators comprising at least two temporal cyclical rotators having opposite rotation directions; and
    a second plurality of rotators, each of said second plurality of rotators comprising at least two temporal cyclical rotators having opposite rotation directions;
    each temporal cyclical rotator having a plurality of inlets and a plurality of outlets, where each inlet of said plurality of inlets is communicatively connected to a switch module of said plurality of switch modules and each outlet of said plurality of outlets is communicatively connected to a switch module of said plurality of switch modules and where said temporal cyclical rotator cyclically connects each inlet of said plurality of inlets to each outlet of said plurality of outlets;
    each switch module having a data memory logically divided into:
        a first section for storing data received directly from data sources;
        a second section for storing data in transit for switching to other switch modules among said plurality of switch modules, said second section logically divided into a number of sub-sections, each sub-section of said number of sub-sections corresponding to one switch module from among said plurality of switch modules and one temporal cyclical rotator from among said at least two temporal cyclical rotators of said first rotator and said at least two temporal cyclical rotators of said second rotator; and
        a third section for storing data segments directly destined for data sinks;
    wherein each switch module of said plurality of switch modules is:
        connected exclusively to a single first rotator from among said first plurality of rotators by a first dual link; and
        connected exclusively to a single second rotator from among said second plurality of rotators by a second dual link;
    wherein any two switch modules among said plurality of switch modules connected to a common rotator in said first plurality of rotators connect only to different rotators in said second plurality of rotators; and
    wherein each rotator in said first plurality of rotators is connected to as many switch modules in said plurality of switch modules as there are rotators in said second plurality of rotators.

2. The two-dimensional circulating switch of claim 1 wherein:
    said first dual link includes:
        at least one channel from said each switch module to each temporal cyclical rotator of said at least two temporal cyclical rotators of said first rotor; and
        at least one channel from said each temporal cyclical rotator of said at least two temporal cyclical rotators of said first rotor to said each switch module; and
    said second dual link includes:
        at least one channel from said each switch module to each temporal cyclical rotator of said at least two temporal cyclical rotators of said second rotor and at least one channel from said each temporal cyclical rotator of said at least two temporal cyclical rotators of said second rotor to said each switch module.

3. The two-dimensional circulating switch of claim 1 further comprising a master controller communicatively connected to at least one switch module in said plurality of switch modules, where said master controller transmits, via said at least one switch module, a schedule to each switch module in said plurality of switch modules.

4. The two-dimensional circulating of claim 1 wherein one of said any two switch modules connects to one rotator in said second plurality of rotators and another of said any two switch modules connects to a different rotator in said second plurality of rotators.

5. A two-dimensional circulating switch comprising:
    a plurality of rotators each including at least two temporal cyclical rotators;
    a plurality of primary one-dimensional circulating switches, each including at least two switch modules, selected from among a plurality of switch modules, interconnected by a rotator selected from among said plurality of rotators; and
    a plurality of secondary one-dimensional circulating switches, each including at least two switch modules, selected from among said plurality of switch modules, interconnected by a rotator selected from among said plurality of rotators;

a master controller connecting to a host switch module selected from among said plurality of switch modules, said master controller:
    stores a connectivity pattern of each temporal cyclical rotator of said at least two temporal cyclical rotators of each rotor in said plurality of rotors;
    determines a set of routes for each directed pair of switch modules in said plurality of switch modules, said directed pair of switch modules including a source switch module and a destination switch module;
    determines for each route in said set of routes a systematic transit delay;
    labels said each route according to a corresponding systematic transit delay; and
    sorts said routes in said set of routes according to said systematic transit delay;
wherein each primary one-dimensional circulating switch includes a switch module from each secondary one-dimensional circulating switch.

6. The two-dimensional circulating switch of claim 5 wherein each route, in said set of routes, is constrained to traverse at most two intermediate switch modules.

7. The two-dimensional circulating switch of claim 5 wherein when said each directed pair of switch modules belongs to different primary one-dimensional circulating switches and different secondary circulating switches, said set of routes includes:
    at least one two-path route along a primary one-dimensional circulating switch in which said source switch module is included then along a secondary one-dimensional circulating switch in which said destination switch module is included;
    at least one two-path route along a secondary one-dimensional circulating switch in which said source switch module is included then along a primary one-dimensional circulating switch in which said destination switch module is included;
    a number, at least equal to the number of primary one-dimensional circulating switches in said plurality of primary one-dimensional circulating switches minus two, of three-path routes each starting along a secondary one-dimensional circulating switch in which said source switch module is included and ending along a secondary one-dimensional circulating switch in which said destination switch module is included; and
    a number, at least equal to the number of secondary one-dimensional circulating switches in said plurality of secondary one-dimensional circulating switches minus two, of three-path routes each starting along a primary one-dimensional circulating switch in which said source switch module is included and ending along a primary one-dimensional circulating switch in which said destination switch module is included.

8. A method of scheduling a connection from a source switch module to a destination switch module in a two-dimensional circulating switch having a plurality of rotators and a plurality of switch modules arranged into a first number of primary one-dimensional circulating switches and a second number of secondary one-dimensional circulating switches, where each primary one-dimensional circulating switch includes a switch module from each secondary one-dimensional circulating switch, the method comprising:
    designating a set of routes from said source switch module to said destination switch module, each route in said set of routes including at least two paths, each path traversing one rotator selected from among said plurality of rotators;
    classifying each route in said set of routes as one of a zero-order route, a first-order route, and a second-order route, where a zero-order route traverses one rotator, a first-order route traverses two rotators, and a second-order route traverses three rotators;
    performing a vacancy-matching process for successive paths in at least one route in said set of routes; and
    determining a sufficient number of time slots in a preselected scheduling time frame for said connection.

9. The method of claim 8 further comprising using availability matrices each associated with a respective rotator in said plurality of rotators to indicate an occupancy state of each path traversing said each rotator.

10. The method of claim 9 further comprising:
    performing, for said first-order routes, a first-order vacancy-matching process to determine a number of allocable time slots not exceeding said sufficient number of time slots; and
    performing, for said second-order routes, a second-order vacancy-matching process if said number of allocable time slots is less than said sufficient number of time slots.

11. The method of claim 10 wherein said first-order vacancy-matching process includes:
    selecting a route from said first-order routes, where said route specifies a first rotator, an intermediate switch module, and a second rotator;
    determining, using said availability matrices, whether a first path from said source switch module to said intermediate switch module is available via said first rotator and a second path from said intermediate switch module to said destination switch module is available via said second rotator; and
    where both said first path and said second path are available, allocating said first path and said second path to said connection.

12. The method of claim 10 wherein said second-order vacancy-matching process includes:
    selecting a route from said second-order routes, where said route specifies a third rotator, a second intermediate switch module, a fourth rotator, a third intermediate switch module, and a fifth rotator;
    determining, using said availability matrices, whether a third path from said source switch module to said second intermediate switch module is available via said third rotator, a fourth path from said second intermediate switch module to said third intermediate switch module via said fourth rotator is available, and a fifth path from said third intermediate switch module to said destination switch module via said fifth rotator is available; and
    where said third path, said fourth path, and said fifth path are available, allocating said third path, said fourth path, and said fifth path to said connection.

13. The method of claim 9 further including:
    associating a systematic transit delay with each of said first-order routes and said second-order routes;
    appending, at said source switch module, an indication of said systematic transit delay with each of data segments sent from said source switch module to said destination switch module; and
    sequencing, at said destination switch module, said data segments according to said indication of said systematic transit delay.

14. The method of claim 8 wherein said sufficient number of time slots is determined according to a flow rate specified for said connection.

* * * * *

UNITED STATES PATENT AND TRADEMARK OFFICE
CERTIFICATE OF CORRECTION

PATENT NO. : 7,602,771 B1
APPLICATION NO. : 11/025077
DATED : October 13, 2009
INVENTOR(S) : Maged E. Beshai Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1310 days.

Signed and Sealed this

Fourteenth Day of December, 2010

David J. Kappos
*Director of the United States Patent and Trademark Office*